United States Patent
Fukuda et al.

(10) Patent No.: US 10,802,999 B2
(45) Date of Patent: Oct. 13, 2020

(54) INDUSTRIAL DEVICE COMMUNICATION SYSTEM, COMMUNICATION METHOD, AND INDUSTRIAL DEVICE

(71) Applicant: Kabushiki Kaisha Yaskawa Denki, Kitakyushu-shi (JP)

(72) Inventors: Mamoru Fukuda, Kitakyushu (JP); Tatsuhiko Sato, Kitakyushu (JP); Naoya Taki, Kitakyushu (JP); Hiroyuki Ishibashi, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 0 days.

(21) Appl. No.: 15/920,451

(22) Filed: Mar. 14, 2018

(65) Prior Publication Data
US 2018/0203818 A1    Jul. 19, 2018

Related U.S. Application Data

(63) Continuation of application No. PCT/JP2015/076474, filed on Sep. 17, 2015.

(51) Int. Cl.
*G06F 13/362* (2006.01)
*H04L 12/40* (2006.01)
(Continued)

(52) U.S. Cl.
CPC .......... *G06F 13/362* (2013.01); *G05B 15/02* (2013.01); *G05B 19/41855* (2013.01);
(Continued)

(58) Field of Classification Search
None
See application file for complete search history.

(56) References Cited

U.S. PATENT DOCUMENTS

| 7,353,321 B2 * | 4/2008 | Steinmetz ............. G06F 3/0607 710/3 |
| 8,972,521 B2 * | 3/2015 | Fritsche .................. H04L 12/42 709/217 |

(Continued)

FOREIGN PATENT DOCUMENTS

| EP | 1320222 A1 | 6/2003 |
| JP | S58-181133 A | 10/1983 |

(Continued)

OTHER PUBLICATIONS

English Translation of International Search Report for PCT/JP2015/076474 dated Nov. 24, 2015.

(Continued)

*Primary Examiner* — Henry Tsai
*Assistant Examiner* — Christopher A Bartels
(74) *Attorney, Agent, or Firm* — HEA Law PLLC

(57) ABSTRACT

An industrial device communication system comprising: industrial devices that function as communication masters; industrial devices that function as communication slaves that receive control data from the industrial devices that function as communication masters; communication lines that communicably connect the industrial devices to one another; one or more switches for causing a communication group including the industrial devices that function as communication masters and the industrial devices that function as communication slaves to communicate independently from one or more other communication groups; and one or more switch controllers that control the one or more switches, causing the switches to switch between a state in which an inter-group communication line present between the communication group and the one or more other communication groups is disconnected, and a state in which the disconnected inter-group communication line is connected, according to the (Continued)

communication group that independently communicates in each of periods.

20 Claims, 14 Drawing Sheets

(51) Int. Cl.
    *H04L 12/403*     (2006.01)
    *G05B 19/418*     (2006.01)
    *G05B 15/02*     (2006.01)
    *G06F 13/40*     (2006.01)

(52) U.S. Cl.
    CPC ........ *G06F 13/4022* (2013.01); *H04L 12/403* (2013.01); *H04L 12/40169* (2013.01)

(56) References Cited

U.S. PATENT DOCUMENTS

| | | | |
|---|---|---|---|
| 2005/0198247 A1* | 9/2005 | Perry | H04L 7/0008 709/223 |
| 2005/0204078 A1* | 9/2005 | Steinmetz | G06F 3/0611 710/38 |
| 2006/0056319 A1* | 3/2006 | Markert | H04L 45/28 370/258 |
| 2006/0146810 A1* | 7/2006 | Bui | H04L 12/5601 370/386 |
| 2009/0138732 A1* | 5/2009 | Chang | H04B 3/54 713/300 |
| 2009/0284934 A1* | 11/2009 | Nielsen | H05K 7/1461 361/730 |
| 2011/0221485 A1* | 9/2011 | He | H04J 3/0667 327/144 |
| 2011/0247056 A1* | 10/2011 | Lee | H04M 1/7253 726/5 |
| 2012/0066545 A1* | 3/2012 | Abe | G06F 11/1654 714/5.1 |
| 2012/0179849 A1* | 7/2012 | Mizutani | H04L 12/4035 710/110 |
| 2012/0188603 A1 | 7/2012 | Pilsl et al. | |
| 2012/0271924 A1* | 10/2012 | Spitaels | H04L 61/2092 709/220 |
| 2012/0275501 A1* | 11/2012 | Rotenstein | H04J 3/0667 375/220 |
| 2013/0216218 A1* | 8/2013 | Cao | H04L 7/04 398/25 |
| 2014/0071982 A1* | 3/2014 | Chandhoke | H04J 3/06 370/355 |
| 2014/0355619 A1 | 12/2014 | Fukuda et al. | |
| 2015/0067084 A1* | 3/2015 | Yeh | G06F 11/2007 709/209 |
| 2015/0154136 A1* | 6/2015 | Markovic | G06F 13/4022 710/317 |
| 2016/0154756 A1* | 6/2016 | Dodson | G06F 13/4022 710/316 |
| 2016/0283221 A1* | 9/2016 | Kochar | G06F 9/45558 |
| 2017/0090510 A1* | 3/2017 | Tennant | G06F 1/12 |
| 2017/0099158 A1* | 4/2017 | Mizutani | G05B 19/054 |
| 2018/0225230 A1* | 8/2018 | Litichever | G06F 21/56 |
| 2019/0246444 A1* | 8/2019 | Kanzaki | H04L 69/40 |

FOREIGN PATENT DOCUMENTS

| | | |
|---|---|---|
| JP | 2012-157003 A | 8/2012 |
| JP | 2014-233008 A | 12/2014 |
| JP | 2016-501727 A | 1/2016 |
| WO | 2004032419 A2 | 4/2004 |

OTHER PUBLICATIONS

Search Report dated Apr. 2, 2019, for corresponding EP Patent Application No. 15904105.2.
Office Action dated Mar. 19, 2020, for corresponding CN Patent Application No. 201580082926.2 with English translation.

* cited by examiner

| STATION | PORT TYPE | OVERALL COMMUNICATION PERIOD | OUTPUT DATA TRANSMISSION PERIOD 1 | INPUT DATA TRANSMISSION PERIOD 1 | OUTPUT DATA TRANSMISSION PERIOD 2 | INPUT DATA TRANSMISSION PERIOD 2 |
|---|---|---|---|---|---|---|
| COMMUNICATION MASTER M10 | A | ON | OFF | OFF | OFF | OFF |
| | B | ON | ON | ON | OFF | OFF |
| COMMUNICATION SLAVE S11 | A | ON | ON | ON | ON | OFF |
| | B | ON | ON | ON | ON | ON |
| COMMUNICATION SLAVE S12 | A | ON | ON | ON | ON | ON |
| | B | ON | ON | OFF | ON | ON |
| COMMUNICATION SLAVE S13 | A | ON | OFF | OFF | ON | ON |
| | B | ON | ON | ON | ON | ON |
| COMMUNICATION MASTER M20 | A | ON | ON | ON | ON | ON |
| | B | ON | ON | ON | ON | ON |
| COMMUNICATION SLAVE S21 | A | ON | ON | OFF | ON | ON |
| | B | ON | OFF | OFF | ON | ON |
| COMMUNICATION SLAVE S22 | A | ON | OFF | OFF | ON | ON |
| | B | ON | OFF | OFF | ON | ON |
| COMMUNICATION MASTER M30 | A | ON | OFF | OFF | ON | ON |
| | B | ON | OFF | OFF | OFF | OFF |

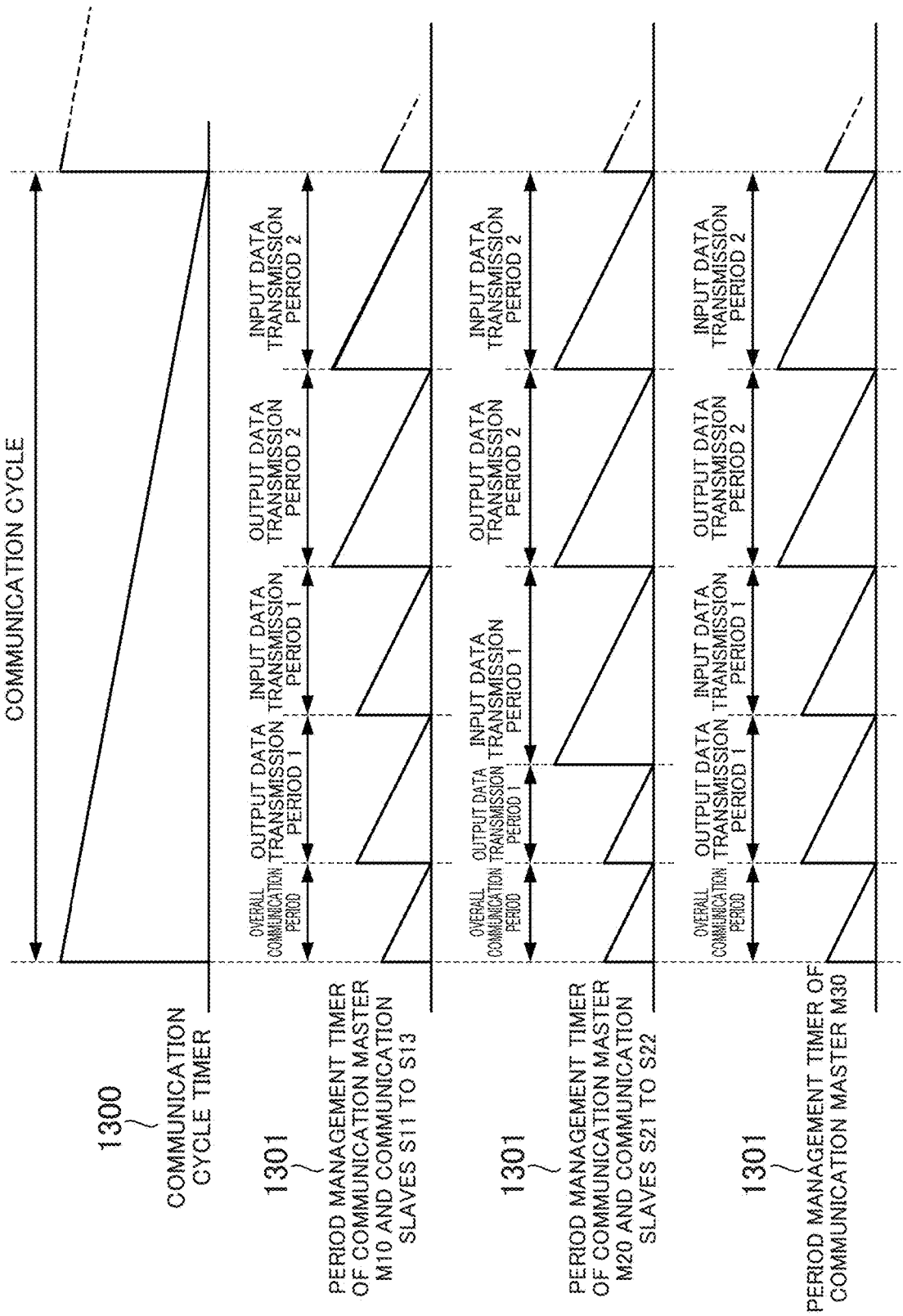

INDUSTRIAL DEVICE COMMUNICATION SYSTEM, COMMUNICATION METHOD, AND INDUSTRIAL DEVICE

INCORPORATION BY REFERENCE

The present disclosure contains subject matter related to that disclosed in International Patent Application PCT/JP2015/076474 filed in the Japan Patent Office on Sep. 17, 2015, the entire contents of which are hereby incorporated by reference.

BACKGROUND OF THE INVENTION

Field of the Invention

The embodiments disclosed herein relate to an industrial device communication system, a communication method, and an industrial device.

Description of the Related Art

JP2014-233008A describes a system in which a communication master and a plurality of communication slaves that receive control data from the communication master are respectively linearly connected, a highest order communication slave receives control data transmitted by the communication master, and the control data is transmitted to low order communication slaves in order.

SUMMARY OF THE INVENTION

An industrial device communication system according to an aspect of the present invention includes: a plurality of industrial devices that function as communication masters; a plurality of industrial devices that function as communication slaves that receive control data from the industrial devices that function as communication masters; communication lines that communicably connect the industrial devices to one another; one or more switches for causing a communication group including the industrial devices that function as communication masters and the industrial devices that function as communication slaves to communicate independently from one or more other communication groups; and one or more switch controllers that control the one or more switches, causing the one or more switches to switch between a state in which an inter-group communication line present between the communication group and the one or more other communication groups is disconnected, and a state in which the disconnected inter-group communication line is connected, according to the communication group that independently communicates in each of a plurality of periods.

BRIEF DESCRIPTION OF THE DRAWINGS

FIG. 7 is a diagram showing an example of switch information.

FIG. 8 is a diagram showing the operations of communication cycle timers and period management timers of the industrial devices.

DESCRIPTION OF THE EMBODIMENTS

1. Overall Configuration of an Industrial Device Communication System

An embodiment of the present invention is explained in detail below with reference to the drawings. In this embodiment, an industrial device communication system (hereinafter simply referred to as communication system) includes a plurality of industrial devices functioning as at least either one of communication masters and communication slaves. The communication masters are industrial devices that control the communication slaves and are, for example, one or more controllers that control devices for industrial use such as servo amplifier and an I/O device. The communication slaves are industrial devices that receive control data of the communication masters and are, for example, the devices for industrial use described above.

Figure 1:
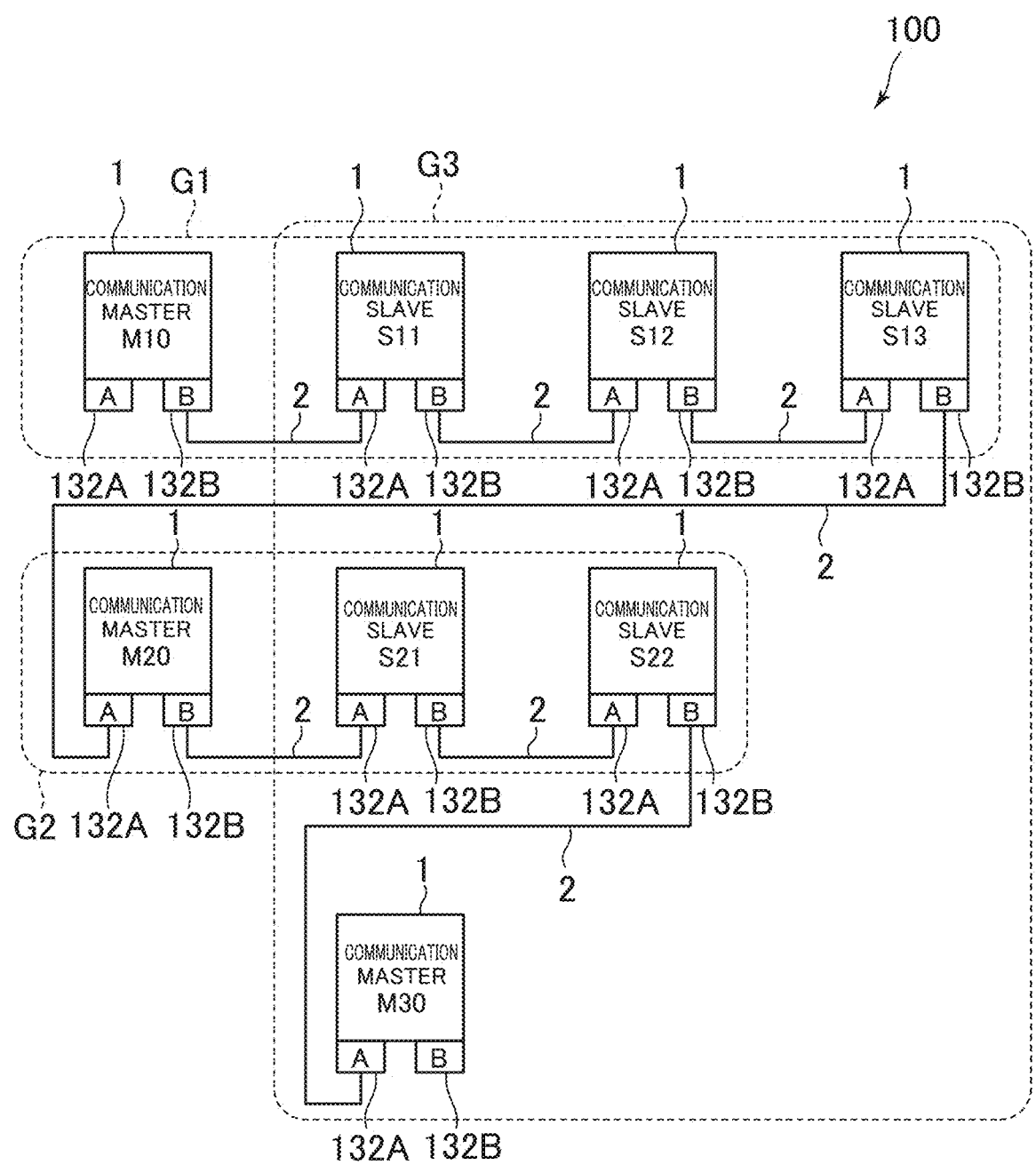
FIG. 1 is a diagram showing an example of an overall configuration of a communication system in this embodiment.

FIG. 1 is a diagram showing an example of an overall configuration of the communication system in this embodiment. As shown in FIG. 1, a communication system 100 includes a plurality of industrial devices 1 functioning as communication masters, a plurality of industrial devices 1 functioning as communication slaves, and communication lines 2 that communicably connect the industrial devices 1 to one another. Note that, in this embodiment, the industrial devices 1 have the same physical configuration. Therefore, when the communication masters and the communication slaves are not particularly distinguished, the communication masters and the communication slaves are described as "industrial devices 1". When the communication masters and the communication slaves are distinguished, the communication masters and the communication slaves are described as "communication masters M10 to M30" and "communication slaves S11 to S22".

The industrial devices 1 are used as nodes in a network. In this embodiment, the industrial devices 1 include at least connection ports 132A (an example of upstream side connection ports) and connection ports 132B (an example of downstream side connection ports) for communicably performing connection to the other industrial devices 1. The industrial devices 1 are linearly connected by connecting the connection ports 132A and the connection ports 132B of the industrial devices 1. This connection scheme is also called daisy chain connection. The daisy chain connection is a connection scheme in which a plurality of devices are tied in a row.

The industrial devices 1 may have a function of receiving data addressed to own stations (own nodes) and broadcast data, a function of generating and transmitting data addressed to other stations (other nodes), and a function of receiving data addressed to other stations and transferring the data to the other stations. Note that the data addressed to the other stations means to include multicast data and broadcast data.

In this embodiment, a combination of one communication master and at least one communication slave is referred to as communication group. In other words, the communication group can also be considered a combination of a communication master and a communication slave that transmit and receive data each other. In the communication system 100, a plurality of communication groups can be set. Each of the industrial devices 1 belongs to at least one communication group. In this embodiment, communication groups belonging to a certain period and communication groups belonging to other periods may be different. However, the industrial devices 1 cannot belong to a plurality of communication groups at certain one point in time.

In the example shown in FIG. 1, three communication groups G1 to G3 are present. The communication group G1 includes a communication master M10 and communication slaves S11 to S13. The communication group G2 includes a communication master M20 and communication slaves S21 to S22. The communication group G3 includes a communication master M30 and communication slaves S11 to S22. For example, the communication groups G1 and G2 are respectively equivalent to the modules in the manufacturing apparatus or the manufacturing line explained above. For example, the communication group G3 is a communication group in which the communication master 30 is used as a computer for maintenance to acquire information necessary for maintenance of the industrial devices 1. As explained in detail below, the communication group G1 and the communication group G2 operate in parallel in a certain period and the communication group G3 operates in another period.

2. Detailed Configuration of the Industrial Devices

Figure 2:
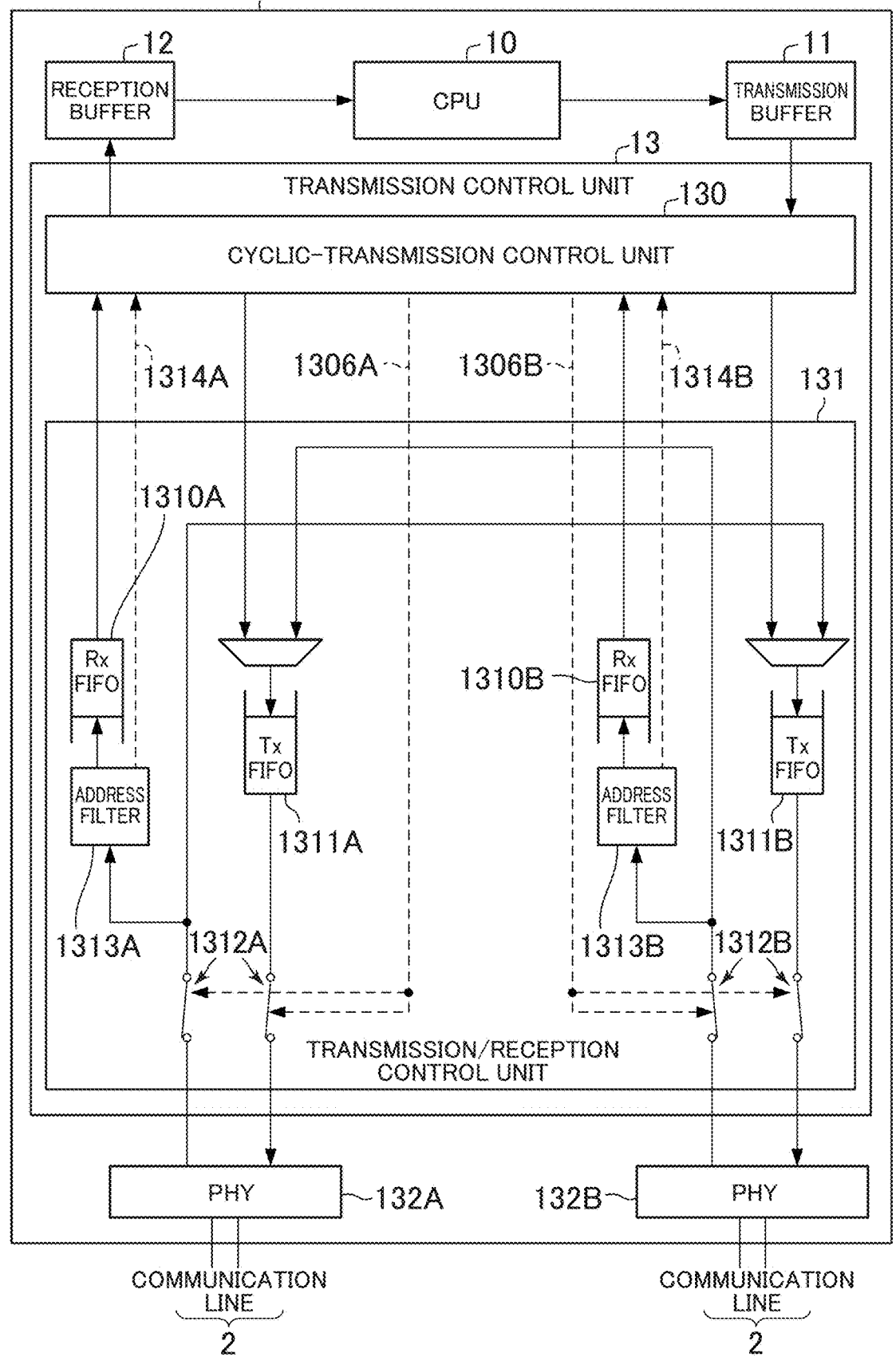
FIG. 2 is a block diagram showing a detailed configuration of industrial devices.

A detailed configuration of the industrial devices 1 is explained. FIG. 2 is a block diagram showing the detailed configuration of the industrial devices 1. As shown in FIG. 2, the industrial device 1 includes a CPU (Central Processing Unit) 10, a transmission buffer 11, a reception buffer 12, a transmission control unit 13, and connection ports 132A and 132B.

The CPU 10 executes various kinds of data processing. For example, the CPU 10 generates output data such as a command transmitted from the communication master to the communication slave. For example, the CPU 10 generates input data such as a response transmitted from the communication slave to the communication master. The CPU 10 executes data processing for controlling an industrial device such as a motor on the basis of received input data and output data.

The transmission buffer 11 is a storage region that stores data to be transmitted. The reception buffer 12 is a storage region that stores received data. The CPU 10 executes processing on the basis of data stored in the reception buffer 12, generates, on the basis of a result of the processing, data to be transmitted, and stores the data in the transmission buffer 11.

The connection ports 132A and 132B are physical communication interfaces (PHY: Physical layers) respectively connected to different communication lines 2. The connection ports 132A and 132B are connected to the communication lines 2, output transmission data converted into predetermined signals to the communication lines 2, and convert input signals from the communication lines 2 into reception data. The communication ports 132A and 132B are respectively connected to the connection port 132A or 132B of other stations via the communication lines 2 and perform transmission and reception of data. Note that the communication lines 2 may adopt a half duplex communication scheme or may adopt a full duplex communication scheme.

The transmission control unit 13 is an integrated circuit (ASIC: Application Specific Integrated Circuit) for communication that controls data transmission and reception of the industrial device 1. The transmission control unit 13 includes a cyclic-transmission control unit 130 and a transmission/reception control unit 131. The cyclic-transmission control unit 130 stores data received from the transmission/reception control unit 131 in the reception buffer 12 and transmits data stored in the transmission buffer 11 to the transmission/reception control unit 131. A detailed configuration of the transmission/reception control unit 131 is explained first. A detailed configuration of the cyclic-transmission control unit 130 is explained later.

[2-1. Detailed Configuration of the Transmission/Reception Control Unit]

The transmission/reception control unit 131 is connected to the connection ports 132A and 132B. As shown in FIG. 2, the transmission/reception control unit 131 has a symmetrical configuration viewed from each of the connection ports 132A and 132B. Therefore, a configuration related to data transmission and reception by the connection port 132A is explained. Concerning a configuration related to data transmission and reception by the connection port 132B, explanation is omitted.

First, in the transmission/reception control unit 131, a configuration related to a flow of data received by the connection port 132A is explained. As shown in FIG. 2, the transmission/reception control unit 131 includes two internal routes for transmitting the data received by the connection port 132A. A first route is a route via a reception buffer 1310A of an FIFO (First-In First-Out) type for transmitting reception data to the cyclic-transmission control unit 130. A second route is a route via a transmission buffer 1311B of the FIFO type for relaying the reception data through the connection port 132B. Note that data generated by the own station transmitted to other stations on the connection port 132B side is also input to the transmission buffer 1311B.

An address filter 1313A for causing only data having a destination address coinciding with an address of the own station or a broadcast address to pass is provided at a pre-stage of the reception buffer 131 0A provided on the first route. When receiving data having the address of the own station, the broadcast address, a common multicast address explained below, or a destination address coinciding with a communication group multicast address explained below, the address filter 1313A outputs a reception notification signal 1314A to the cyclic-transmission control unit 130.

At a pre-stage of the address filter 1313A of the first route, a switch 1312A for causing a communication group to communicate independently from one or more other communication groups is provided. When viewed from the second route, the switch 1312A is provided at a pre-stage of the transmission buffer 1311B via a selector. That is, the address filter 1313A is connected to and the transmission buffer 1311B is connected via the selector to an output terminal of the switch 1312A. Note that the selector is a circuit that includes a plurality of input terminals and one output terminal and outputs, from a common output terminal, data input from any one of the input terminals.

The connection port 132A is connected to an input terminal of the switch 1312A. Reception data is input to the input terminal. A communication line enable signal 1306A is input to the switch 1312A from the cyclic-transmission control unit 130 as a switching signal for ON/OFF of the switch. When the communication line enable signal 1306A is on, the connection port 132A and the first route and the second route are connected. When the communication line enable signal 1306A is off, the connection port 132A and the first route and the second route are disconnected.

A switch 1312B is provided at a post-stage of the transmission buffer 1311B. Like the switch 1312A, the switch 1312B is used for causing a communication group to communicate independently from one or more other communication groups. The transmission buffer 1311B is connected to an input terminal of the switch 1312B. A connection port 132B is connected to an output terminal of the switch 1312B. A communication line enable signal 1306B is input to the switch 1312B from the cyclic-transmission control unit 130 as a switching signal for ON/OFF of the switch. When the communication line enable signal 1306B is on, the connection port 132B and the second route are connected. When the communication line enable signal 1306B is off, the connection port 132B and the second route are disconnected.

A configuration related to a flow of data requested by the cyclic-transmission control unit 130 to be transmitted through the connection port 132A is explained. The transmission/reception control unit 131 includes a transmission buffer 1311A of the FIFO type for transmitting data such as output data of a communication master and input data of a communication slave to the connection port 132A. The transmission buffer 1311A has the same configuration as the configuration of the transmission buffer 1311B provided on the connection port 132B side explained above.

Transmission data supplied from the cyclic-transmission control unit 130 is stored in the transmission buffer 1311A. Then, when the switch 1312A is on, the transmission data is transmitted from the connection port 132A side. That is, even if the transmission data supplied from the cyclic-transmission control unit 130 is stored in the transmission buffer 1311A, when the switch 1312A is off, the transmission buffer 1311A and the connection port 132A are disconnected. Therefore, the transmission data is not transmitted from the connection port 132A side.

[2-2. Detailed Configuration of the Cyclic-Transmission Control Unit]

Figure 3:
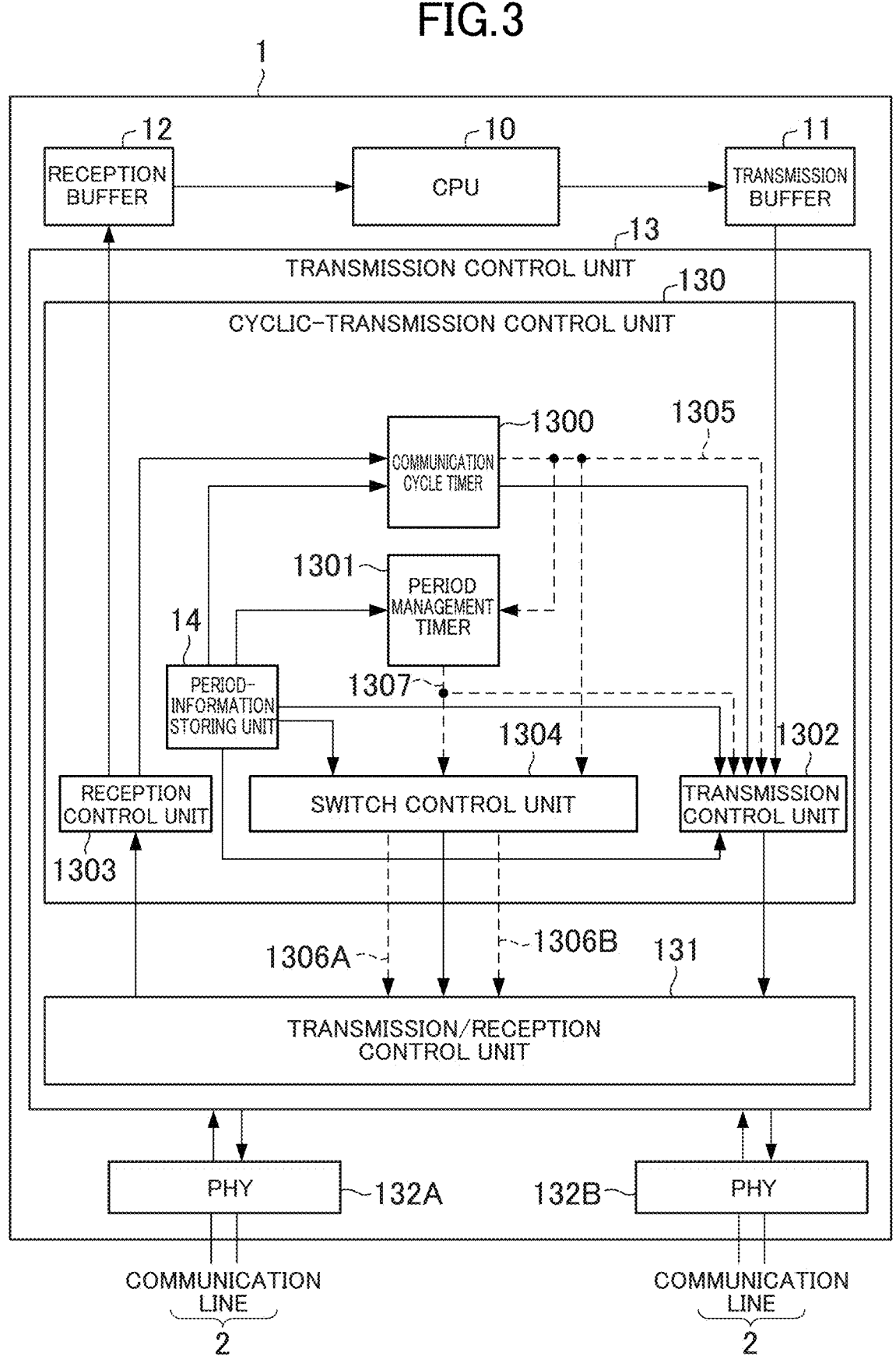
FIG. 3 is a block diagram showing a detailed configuration of a cyclic-transmission control unit.

A detailed configuration of the cyclic-transmission control unit 130 is explained. FIG. 3 is a block diagram showing the detailed configuration of the cyclic-transmission control unit 130. As shown in FIG. 3, the cyclic-transmission control unit 130 includes a communication cycle timer 1300, a period management timer 1301, a transmission control unit 1302, a reception control unit 1303, a switch control unit 1304, and a period-information storing unit 14. Details of the period-information storing unit 14 are explained later. Details of the other components are explained here.

The communication cycle timer 1300 is a timer that clocks a communication cycle. The period management timer 1301 is a timer that clocks periods (an overall communication period and a control transmission period explained later) set in the communication cycle. The transmission control unit 1302 transmits transmission data stored in the transmission buffer 11 to the transmission/reception control unit 131 according to a communication cycle time-up signal 1305 output from the communication cycle timer 1300 and a period management time-up signal 1307 output from the period management timer 1301. The reception control unit 1303 receives reception data from the transmission/reception control unit 131 and stores the reception data in the reception buffer 12 in order to transmit the reception data to the CPU 10.

The switch control unit 1304 outputs the communication line enable signals 1306A and 1306B to the transmission/reception control unit 131 according to the communication cycle time-up signal 1305 output from the communication cycle timer 1300 and the period management time-up signal 1307 output from the period management timer 1301. Specifically, as the communication line enable signals 1306A and 1306B, the switch control unit 1304 outputs OFF when a period when the communication line 2 should be disconnected comes and outputs ON when a period when the communication line 2 should be connected comes.

3. Processing Executed in the Communication System

Figure 4:
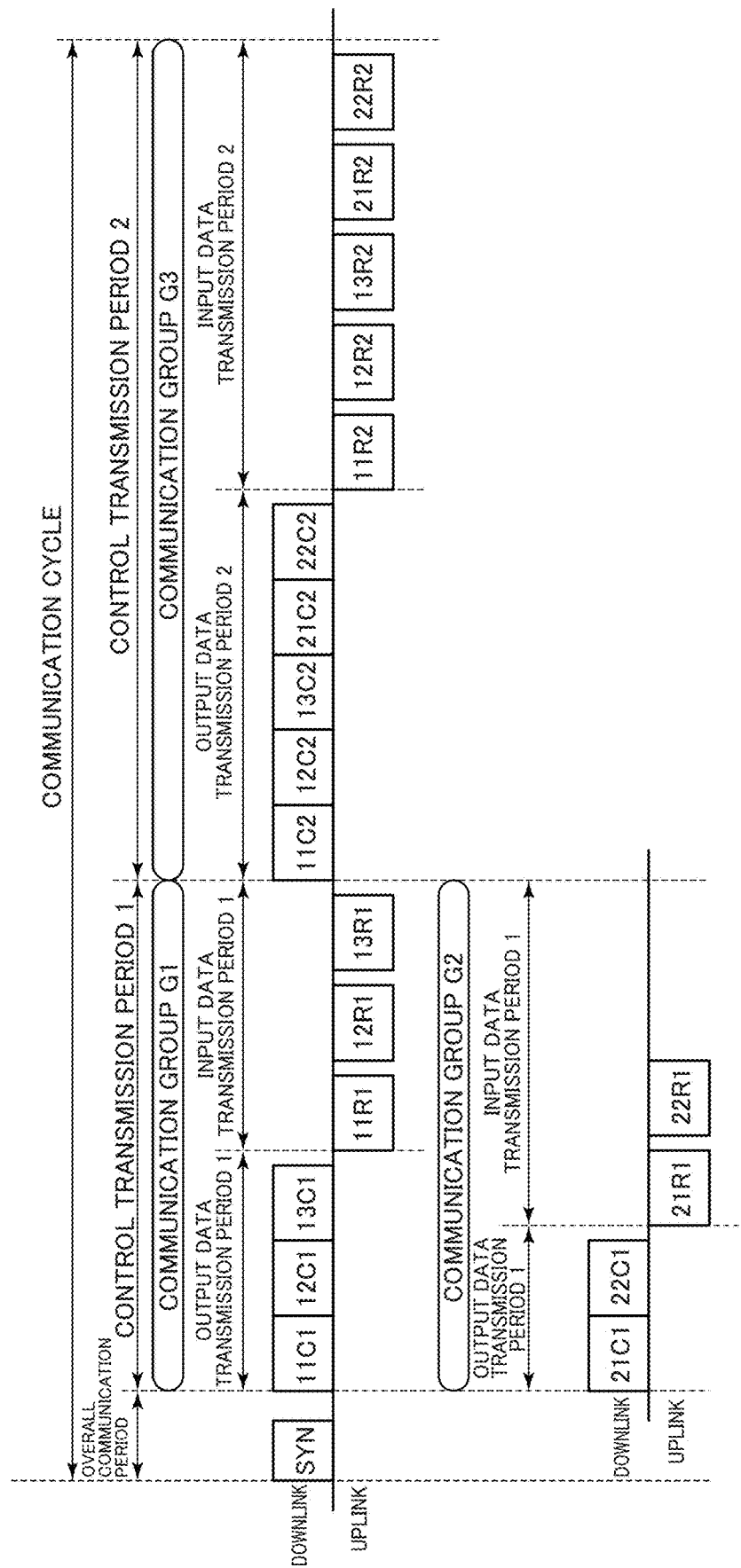
FIG. 4 is a diagram showing data transmitted and received within a communication cycle.

Processing executed in the communication system 100 is explained. In this embodiment, fixed cycle communication is performed in the communication system 100. FIG. 4 is a diagram showing data transmitted and received within one communication cycle. As shown in FIG. 4, the communication cycle is divided into a plurality of periods and includes, for example, one overall communication period and a plurality of control transmission periods.

The overall communication period is a period in which an overall communication group including all the industrial devices 1 included in the communication system 100 is caused to communicate. In an example shown in FIG. 4, the overall communication period is set in the beginning of the communication period. However, a communication period in which the overall communication period is not provided may be present. In the overall communication period, a communication master of the overall communication group transmits a synchronization notification. The communication master of the overall communication group is hereinafter referred to as synchronous communication master in order to distinguish the communication master from communication masters of one or more other communication groups. The synchronous communication master only has to be any one of the industrial devices 1. The synchronous communication master is the communication master M10 here.

In the overall communication period, the industrial devices 1 other than the communication master M10 function as communication slaves and perform synchronization on the basis of a synchronization notification (in FIG. 4, described as "SYN") transmitted from the communication master M10. Consequently, the industrial devices 1 synchronize and can cause start points in time of a communication cycle to coincide. In the overall communication period, only the communication master M10, which is the synchronous communication master, is permitted to perform transmission and transmits the synchronization notification. The synchronization notification only has to be transmitted by broadcast or multicast such that all the other industrial devices 1 can receive the synchronization notification.

Note that, as a method itself of synchronizing the industrial devices 1, various publicly-known methods are applicable. For example, methods disclosed in Japanese Patent No. 4760978 and IEEE1588 (IEEE Standard for a Precision Clock Synchronization Protocol for Networked Measurement and Control Systems) may be adopted. When IEEE1588 is adopted, the synchronization notification is "Sync Message". Measurement of a transmission delay performed using "Delay Request" and "Delay Response" of IEEE1588 may be carried out before the start of the fixed cycle communication (e.g., during initialization).

Figure 5:
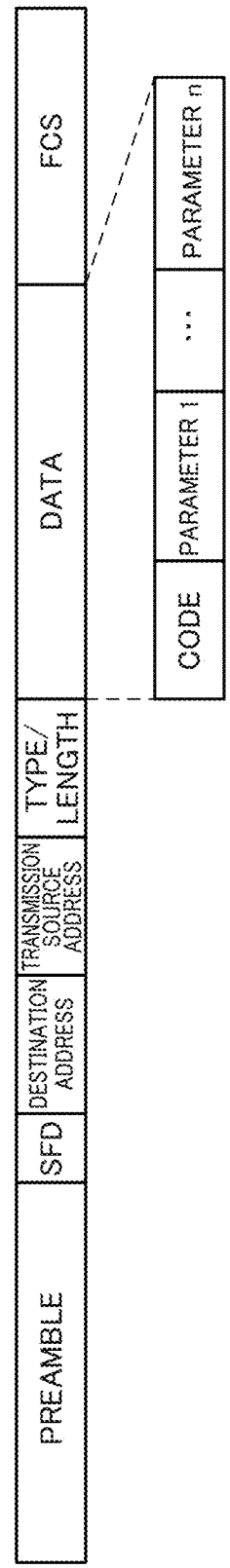
FIG. 5 is a diagram showing an example of a transmission frame in the embodiment.

As a format itself of a transmission frame such as the synchronization notification, formats of various publicly-known communication schemes are applicable. In this embodiment, a transmission frame conforming to an Ethernet (registered trademark) is explained as an example. FIG. 5 is a diagram showing an example of a transmission frame in this embodiment. As shown in FIG. 5, the transmission frame conforming to the Ethernet includes a preamble, a frame start identifier (SFD; Start Flame Delimiter), a destination address, a transmission source address, a type/length, and data and error check (FCS; Flame Check Sequence). In particular, the data includes a code part indicating a type of the data. The code indicates which type of data such as the command (output data), the response (input data), the message data, and the synchronization notification explained above data stored in a parameter 1 to a parameter n are.

The control transmission period is a period in which a communication group independently communicates. In this embodiment, a communication group is set for each of control transmission periods. As shown in FIG. 4, the control transmission periods include output data transmission periods and input data transmission periods. The output data transmission periods are periods in which communication masters transmit output data to communication slaves in a communication group. The input data transmission periods are periods in which the communication slaves in the communication group transmit input data to the communication masters in the communication group. Note that pluralities of output data transmission periods and input data transmission periods may be respectively present in one control transmission period. The output data transmission periods and the input data transmission periods do not have to be particularly divided.

In this embodiment, it is assumed that numbers are added to the control transmission periods sequentially from the control transmission period after the overall communication period. In the example shown in FIG. 4, a control transmission period 1 and a control transmission period 2 are present. In this embodiment, in at least one of a plurality of control transmission periods, each of a plurality of communication groups independently communicates. For example, in the control transmission period 1, each of the communication group G1 and the communication group G2 independently communicates. In other words, in the control transmission period 1, the communication group G1 and the communication group G2 operate temporally in parallel.

For example, in the control transmission period 1, when the communication group G1 and the communication group G2 are connected and operate in parallel, data of one of the communication group G1 and the communication group G2 is transmitted to the other. Mixture of the data occurs. Therefore, in the control transmission period 1, the communication slave S13 present at the end of the communication group G1 turns off the switch 1312B and the communication master M20 present at the end of the communication group G2 turns off the switch 1312A. Consequently, the communication line 2 between the communication slave S13 and the communication master M20 is disconnected. Even if the communication group G1 and the communication group G2 operate in parallel, mixture of data does not occur.

In the example shown in FIG. 4, in the control transmission period 1, output data transmitted to the communication slaves S11 to S13 by the communication master M10 of the communication group G1 are described as "11C1" to "13C1". Input data transmitted to the communication master M10 by the communication slaves S11 to S13 are described as "11R1" to "13R1". In the control transmission period 1, the communication line 2 between the communication slave S13 and the communication master M20 is disconnected. Therefore, the output data "11C1" to "13C1" and the input data "11R1" to "13R1" are not transmitted to the communication group G2. Mixture of data does not occur in the communication group G2.

On the other hand, in the example shown in FIG. 4, output data transmitted to the communication slaves S21 to S22 by the communication master M20 of the communication group G2 are described as "21C1" to "22C1". Input data transmitted to the communication master M20 by the communication slaves S21 to S22 are described as "21R1" to "22R1". In the control transmission period 1, the communication line 2 between the communication slave S13 and the communication master M20 is disconnected. Therefore, the output data "21C1" to "22C1" and the input data "21R1" to "22R1" are not transmitted to the communication group G1. Mixture of data does not occur in the communication group G1.

Further, in this embodiment, communication groups that independently communicate are different from one another according to each of the plurality of control transmission periods. In other words, communication groups change in each of the control transmission periods. For example, the communication group G1 and the communication group G2 are present in the control transmission period 1. However, only the communication group G3 is present in the control transmission period 2. Therefore, the communication groups in the control transmission period 1 and the control transmission period 2 are different from each other.

For example, even if the control transmission period 1 ends and the control transmission period 2 begins, when the communication line 2 between the communication slave S13 and the communication master M20 are kept disconnected, communication cannot be performed in the communication group G3. Therefore, when the control transmission period 2 begins, the communication slave S13 turns on the switch 1312B and the communication master M20 turns on the switch 1312A. Consequently, the communication line 2 between the communication slave S13 and the communication master M20 is connected.

In the example shown in FIG. 4, in the control transmission period 2, output data transmitted to the communication slaves S11 to S22 by the communication master M30 of the communication group G3 are described as "11C2" to "22C2". Input data transmitted to the communication master M30 by the communication slaves S11 to S22 are described as "11R2" to "22R2". In the control transmission period 2, the communication line 2 between the communication slave S13 and the communication master M20 is connected. Therefore, the output data "11C2" to "22C2" and the input data "11R2" to "22R2" can be transmitted and received in the communication group G3. Note that, in the control transmission period 2, the communication master M20 does not particularly function as a communication master and a communication slave and plays a role of a repeater that relays data between the communication slave S13 and the communication slave S21. Naturally, the industrial device 1 functioning as a communication master in a certain control transmission period may function as a communication slave in other control transmission periods.

As explained above, in this embodiment, the switches 1312A and 1312B of the industrial devices 1 are switched such that communication of communication groups corresponding to the control transmission period can be realized. Therefore, the one or more switch control units 1304 of the industrial devices 1 control, according to communication groups that independently communicate in each of the plurality of control transmission periods, the switches 1312A and 1312B to switch a state in which an inter-group communication line present between the communication lines and one or more other communication lines is disconnected and a state in which the disconnected inter-group communication line is connected. In this embodiment, the one or more switch control units 1304 control the switches 1312A and 1312B on the basis of period information stored by the period-information storing unit 14.

Figure 6:
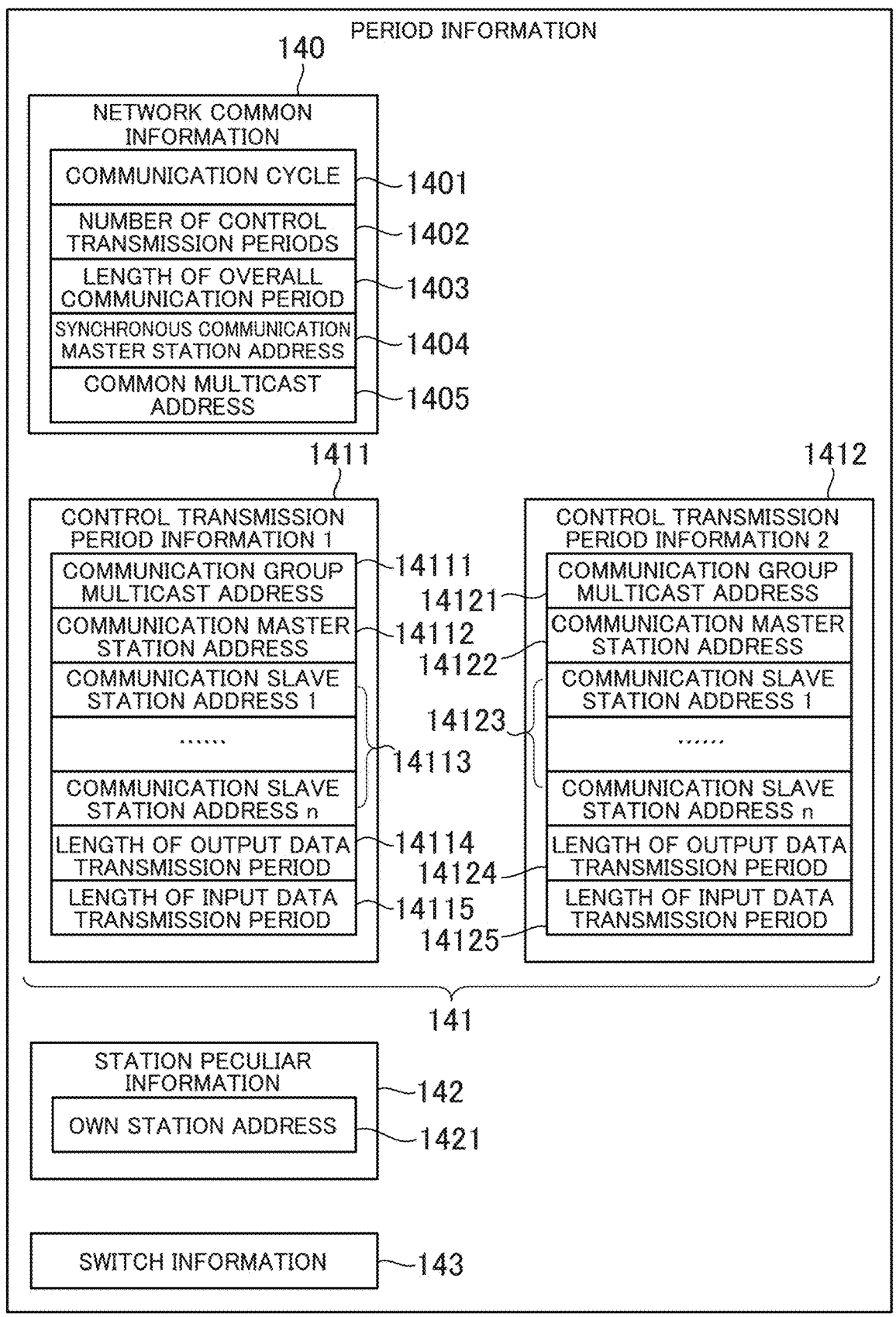
FIG. 6 is a diagram showing a configuration example of period information.

FIG. 6 is a diagram showing a configuration information of the period information. The period information is information concerning a relation between each of the plurality of control transmission periods and communication groups that independently communicate in the control transmission period. The period information only has to be set in advance for the industrial devices 1 before a first communication cycle comes and exchange of control data is started. For example, the industrial devices 1 may include nonvolatile memories. The period information may be saved in the nonvolatile memories. In this case, during the start of the communication system 100, the industrial devices 1 read out the period information stored in the nonvolatile memories of the own stations.

Besides, for example, the period information may be set in the industrial devices 1 in an initialization period in which initialization processing of the communication system 100 is executed. The initialization period is a period before the first communication cycle starts. In the initialization period of the communication system 100, communication is performed in an initial communication group including all the industrial devices 1 included in the communication system 100. In the initialization period, a communication master of the initial communication group transmits the period information to the other industrial devices 1. The communication master of the initial communication group only has to be any one of the industrial devices 1. For example, the communication master may be the communication master M10. In this case, the period information concerning all the industrial devices 1 is stored in the nonvolatile memory of the communication master M10. The industrial devices 1 other than the communication master M10 execute the initialization processing according to an initialization command received from the communication master M10. The communication master M10 may include the period information in the initialization command and transmit the period information to the other industrial devices 1 or may transmit the period information to the other industrial devices 1 separately from the initialization command. As the initialization processing itself, various kinds of publicly-known processing are applicable. For example, initialization of a parameter indicating the number of revolutions of a motor is executed.

As shown in FIG. 6, the period information includes network common information 140, control transmission period information 141, station peculiar information 142, and switch information 143.

The network common information 140 is information common to all the industrial devices 1 in the communication system 100. The network common information 140 includes information 1401 indicating the length of a communication period, information 1402 indicating the number of control transmission periods (in this embodiment, two), information 1403 indicating the length of the overall communication period, information 1404 indicating a station address of the synchronous communication master (in this embodiment, the communication master M10), and information 1405 indicating a common multicast address used to transmit data to all the industrial devices 1 in the communication system 100. The station address can be considered information for uniquely identifying the industrial devices 1 in the communication system 100.

The control transmission period information 141 is information prepared for each of the control transmission periods. In this embodiment, content of the control transmission period information 141 is different according to the industrial device 1. For example, the control transmission period information 141 is used to identify a communication group to which the industrial device 1 belongs. In a data example shown in FIG. 6, the control transmission period information 141 is prepared by the number of control transmission periods allocated to communication cycles (a numerical value indicated by the information 1402 of the network common information 140). In this embodiment, since there are two control transmission periods, the control transmission period information 141 includes two kinds of information, that is, control transmission period information 1411 and control transmission period information 1412.

The control transmission period information 1411 includes information 14111 for identifying a multicast address used in a communication group in the control transmission period 1, information 14112 indicating a station address of a communication master in the communication group, information 14113 indicating a station address of a communication slave in the communication group, information 14114 indicating the length of an output data transmission period, and information 14115 indicating the length of an input data transmission period.

In the control transmission period information 1411 stored in the communication master M10 and the communication slaves S11 to S13, information concerning the communication group G1 is stored. Therefore, for example, a multicast address used in the communication group G1 is stored in the information 14111. A station address of the communication master M10 is stored in the information 14112. Station addresses of the communication slaves S11 to S13 are stored in the information 14113. A numerical value indicating the length of the output data transmission period 1 of the communication group G1 is stored in the information 14114. A numerical value indicating the length of the input data transmission period 1 of the communication group G1 is stored in the information 14115.

On the other hand, information concerning the communication group G2 is stored in the control transmission period information 1411 stored in the communication master M20 and the communication slaves S21 to S22. Therefore, for example, a multicast address used in the communication group G2 is stored in the information 14111. A station address of the communication master M20 is stored in the information 14112. A station address of each of the communication slaves S21 to S22 is stored in the information 14113. A numerical value indicating the length of an output data transmission period of the communication group G2 is stored in the information 14114. A numerical value indicating the length of an input data transmission period of the communication group G2 is stored in the information 14115.

The control transmission period information 1411 stored in the communication master M30 only has to be the same information as the information of either one of the communication group G1 and the communication group G2. However, the communication master M30 does not belong to both of the communication groups G1 and G2 in the control transmission period 1. The communication master M30 stores the control transmission period information 1411 in order to specify the length of the control transmission period 1.

The control transmission period information 1412 is information concerning the control transmission period 2. A data configuration of the control transmission period information 1412 is the same as the data configuration of the control transmission period information 1411. Information concerning the communication group G3 in the control transmission period 2 can be considered to be stored in the control transmission period information 1412. Therefore, in this embodiment, a multicast address used in the communication group G3 is stored in the information 14121 stored in the communication master M30 and the communication slaves S11 to S22. A station address of the communication master M30 is stored in the information 14122. A station address of each of the communication slaves S11 to S22 is stored in the information 14123. A numerical value indicating the length of an output data transmission period of the communication group G3 is stored in the information 14124. A numerical value indicating the length of an input data transmission period of the communication group G3 is stored in the information 14125.

The control transmission period information 1412 stored in the communication master M10 and the communication master M20 may be the same as the control transmission period information 1412 explained above. However, the communication master M10 and the communication master M20 do not belong to the communication group G3. The communication master M10 and the communication master M20 store the control transmission period information 1412 in order to specify the length of the control transmission period 2.

The station peculiar information 142 is peculiar information different for each of the industrial devices 1. For example, the station peculiar information 142 includes information 1421 indicating an address of the own station.

The switch information 143 is information indicating timing or a period when each of the switches 1312A and 1312B is turned on and off. FIG. 7 is a diagram showing an example of the switch information 143. In FIG. 7, the switch information 143 of the overall communication system 100 is described. However, the industrial devices 1 may store only information related to the own station or may store only information concerning a communication group to which the own station belongs.

As shown in FIG. 7, in the switch information 143, it is defined for each of periods whether each of the switches 1312A and 1312B is turned on or off. For example, in a data example shown in FIG. 7, periods in a communication cycle are arranged in time series order from the left. Therefore, information concerning ON/OFF of each of the switches 1312A and 1312B is stored in the order of the overall communication period, the control transmission period 1 (the output data transmission period 1 and the input data transmission period 1), and the control transmission period 2 (the output data transmission period 2 and the input data transmission period 2). The industrial devices 1 refer to the overall communication period according to time-up of the communication cycle timer 1300. Thereafter, the industrial devices 1 refer to right columns one by one according to time-up of the period management timer 1301.

Referring to the communication slave S13 as an example, when the communication cycle timer 1300 times up and the overall communication period begins, the switch control unit 1304 turns on both of the switches 1312A and 1312B to connect the communication line 2. Thereafter, when the period management timer 1301 reaches first time-up and the overall communication period ends (the output data transmission period 1 begins), the switch control unit 1304 turns on the switch 1312A and turns off the switch 1312B. In this state, a communication group 1 and a communication group 2 are separated in terms of communication.

In the communication slave S13, even if the period management timer 1301 reaches second time-up and the output data transmission period 1 ends (the input data transmission period 1 begins), the switch control unit 1304 keeps the disconnected state of the communication line 2. When the period management timer 1301 reaches third time-up and the input data transmission period 1 ends (the output data transmission period 2 begins), the switch control unit 1304 turns on both of the switches 1312A and 1312B to connect the communication line 2. In this state, communication is possible in a communication group 3. Even if the period management timer 1301 reaches fourth time-up and the output data transmission period 2 ends (the input data transmission period 2 begins), the switch control unit 1304 keeps the connected state of the communication line 2.

In the other communication masters M10 to M30 and the communication slaves S11 to S12 and S21 to S22, similarly, the one or more switch control units 1304 control ON/OFF of the switches 1312A and 1312B on the basis of information corresponding to the own stations among the period information shown in FIG. 7. As shown in FIG. 7, among the switches 1312A and 1312B of the industrial devices 1 present at ends of the communication groups, the switch 1312A or 1312B present on the side of the industrial device 1 not belonging the communication group is turned on and off.

FIG. 8 is a diagram showing the operations of the communication cycle timers 1300 and the period management timers 1301 of the industrial devices 1. An example is explained in which down-timers are adopted as both of the communication cycle timers 1300 and the period management timers 1301. However, other timers such as count-up timers may be adopted.

Since the communication cycle is common to the industrial devices 1, as shown in FIG. 8, the operation of the communication period timer 1300 is the same in the industrial devices 1. The communication cycle timer 1300 loads a communication cycle indicated by the information 1401 of the network common information 140 stored in the period-information storing unit 14 and starts count-down of a timer value. When the communication cycle timer 1300 times up, the communication cycle timer 1300 reloads the communication cycle indicated by the information 1401 and starts the count-down of the timer value again. Thereafter, every time the communication cycle timer 1300 times up, the communication cycle timer 1300 repeats the reload of the communication cycle indicated by the information 1401 and the count-down.

Since the overall communication period is also common to the industrial devices, the operation of the period management timer 1301 in the overall communication period is the same as the operations in the industrial devices 1. The period management timer 1301 resets a timer value at timing of time-up of the communication cycle timer 1300, loads the overall communication period indicated by the information 1403 of the network common information 140 stored in the period-information storing unit 14, starts count-down of the timer value. First time-up of the period management timers 1301 of the industrial devices 1 means the end of the overall communication period. That is, the first time-up of the period management timer 1301 means the start of the output data transmission period 1 of the control transmission period 1. Therefore, when the period management timer 1301 reaches the first time-up, the period management timer 1301 loads the output data transmission period 1 indicated by the information 14114 of the control transmission period information 1 stored in the period-information storing unit 14 and starts the count-down of the timer value.

As shown in FIG. 4, the length of the output data transmission period 1 is different in the communication groups G1 and G2. Therefore, as shown in FIG. 8, different timer values are set in the industrial devices 1 (the communication master M10 and the communication slaves S11 to S13) of the communication group G1 and the industrial devices 1 (the communication master M20 and the communication slabs S21 to S22) of the communication group G2. Note that, in the example shown in FIG. 8, it is assumed that, as the control transmission period information 1 of the communication master M30 not belonging to both of the communication groups G1 and G2, the same content as the content of the communication group G1 is stored.

Second time-up of the period management timer 1301 means the end of the output data transmission period 1 of the control transmission period 1. That is, the second time-up of the period management timer 1301 means the start of the input data transmission period 1 of the control transmission period 1. Therefore, when the period management timer 1301 reaches the second time-up, the period management timer 1301 loads the input data transmission period 1 indicated by the information 14115 of the control transmission period information 1 stored in the period-information storing unit 14 and starts the count-down of the timer value.

Third time-up of the period management timer 1301 means the end of the input data transmission period 1 of the control transmission period 1. That is, the third time-up of the period management timer 1301 means the start of the output data transmission period 2 of the control transmission period 2. As shown in FIG. 8, the control transmission period information 1411 is set such that start points in time of the control transmission period 2 are aligned in the industrial devices 1. Thereafter, as in the control transmission period 1, when the period management timer 1301 reaches the third time-up, the period management timer 1301 loads the output data transmission period 2 indicated by the information 14124 of the control transmission period information 1412 stored in the period-information storing unit 14 and starts the count-down of the timer value. When the period management timer 1301 reaches fourth time-up, the period management timer 1301 loads the input data transmission period 2 indicated by the information 14125 of the control transmission period information 1412 stored in the period-information storing unit 14 and starts the count-down of the timer value.

As explained above, until the communication period ends, in odd numbers of times of time-up, the period management timers 1301 of the industrial devices 1 load the output data transmission period and start the count-down referring to the next control transmission period information. In even numbers of times of time-up, the period management timers 1301 load the input data transmission period and start the count-down referring to the control transmission period information.

4. Processing Executed in Each of the Communication Masters and the Communication Slaves The operation of the cyclic-transmission control units 130 of the industrial devices 1, which are the communication masters M10 to M30, and the operation of the cyclic-transmission control unit 130 of the industrial devices 1, which are the communication slaves S11 to S21, are explained.

[4-1. Processing Executed in the Communication Masters]

Figure 9:
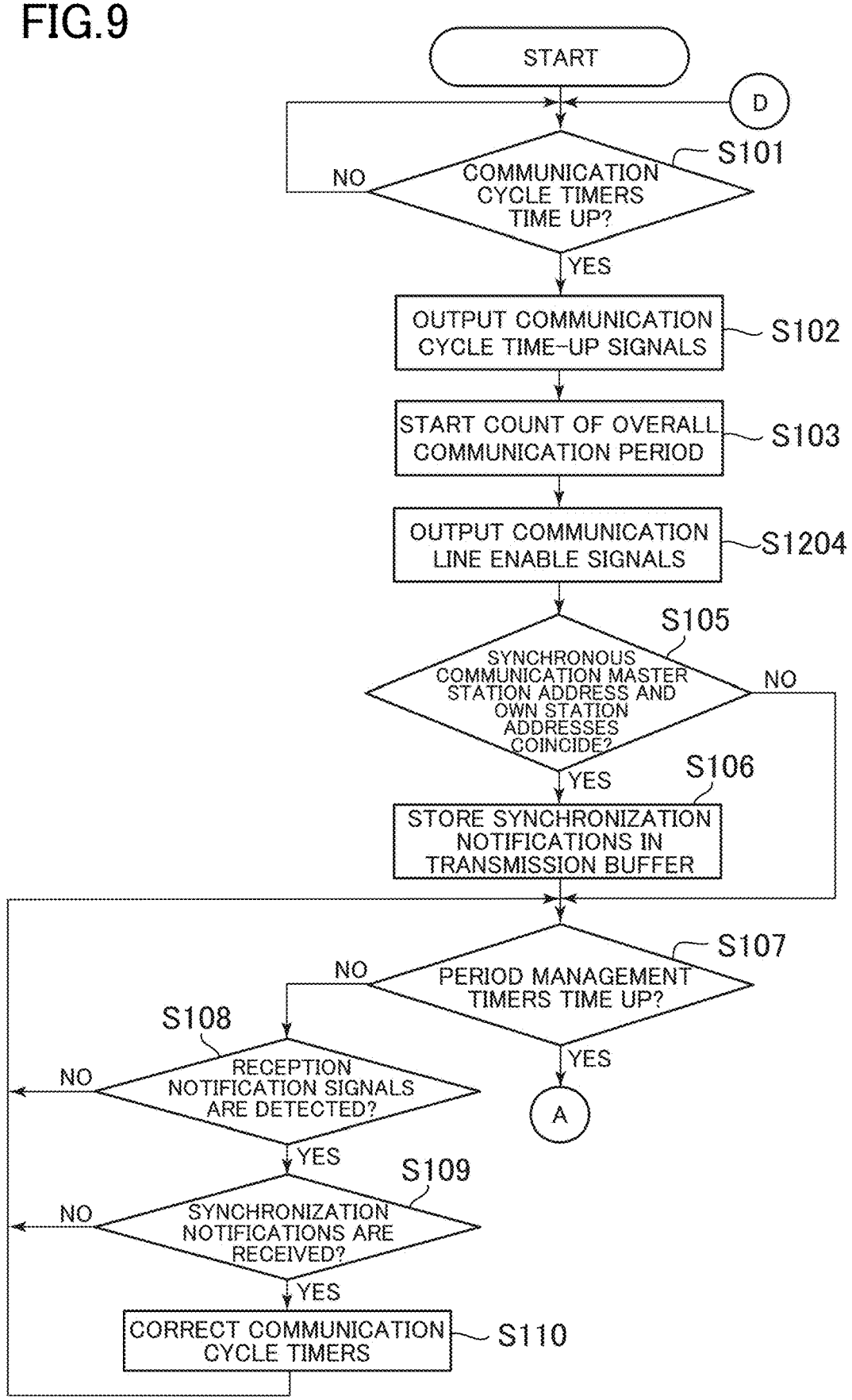
FIG. 9 is a flowchart showing the operation of a cyclic-transmission control unit of a communication master.
Figure 10:
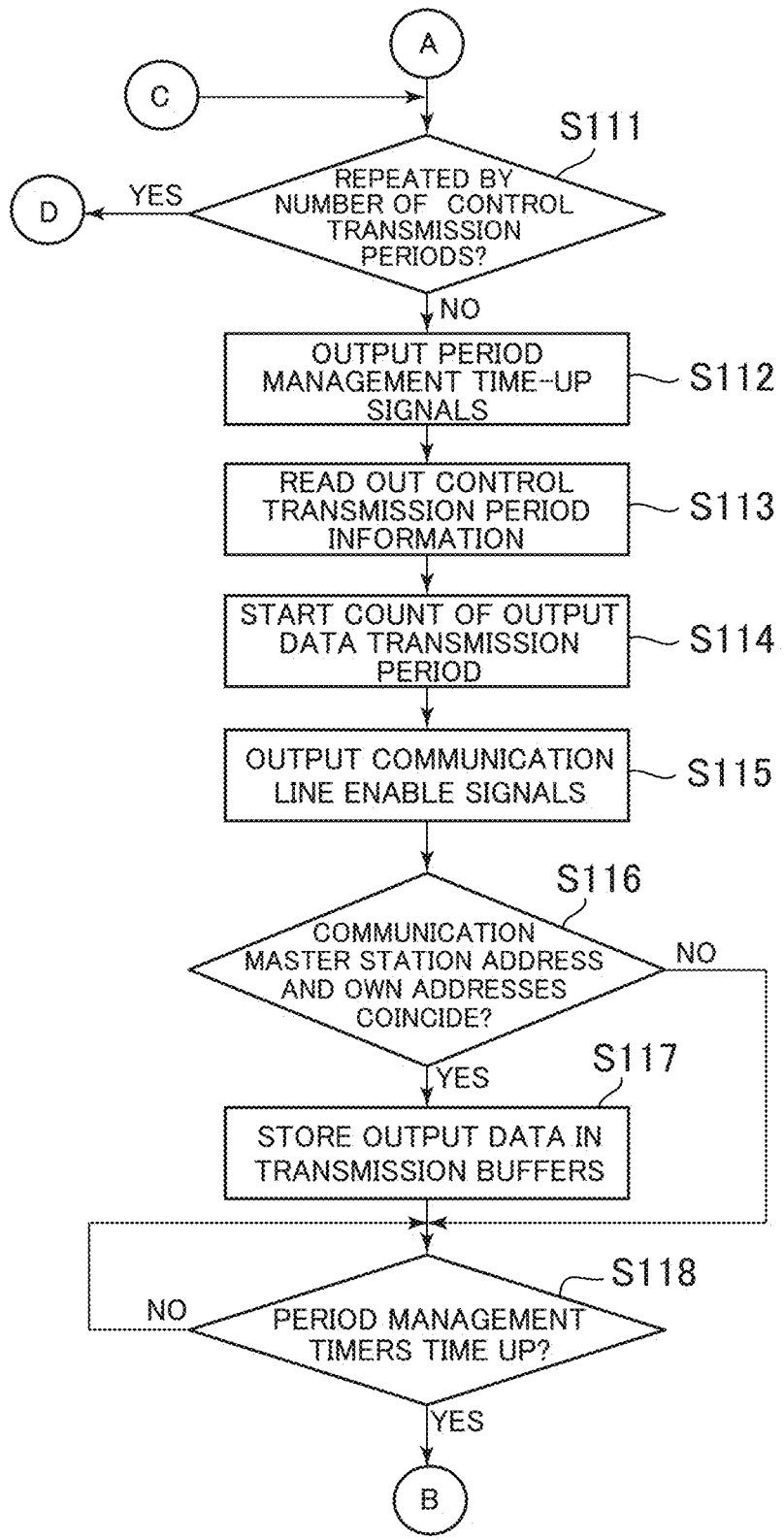
FIG. 10 is a flowchart showing the operation of the cyclic-transmission control unit of the communication master.
Figure 11:
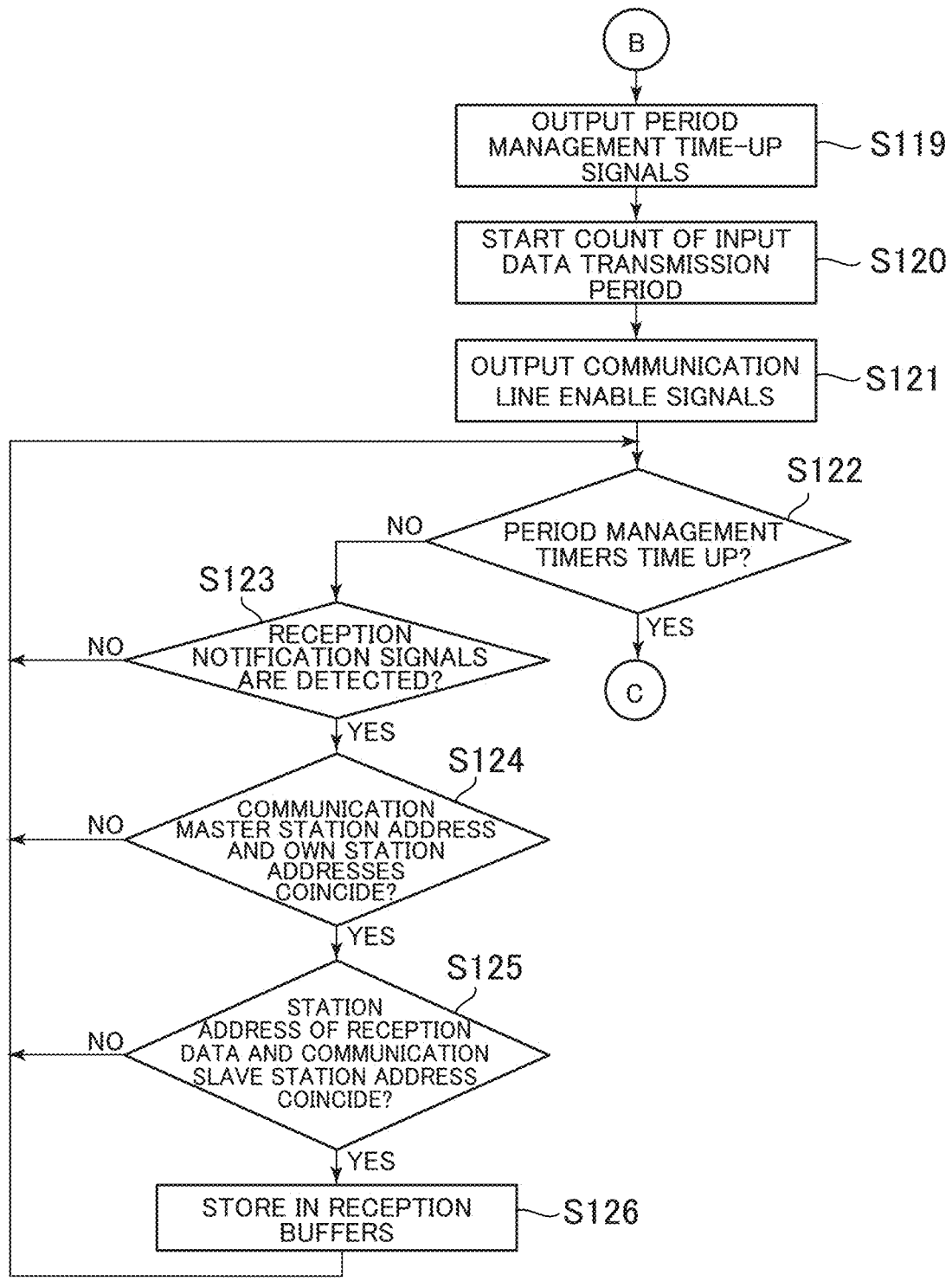
FIG. 11 is a flowchart showing the operation of the cyclic-transmission control unit of the communication master.

FIGS. 9 to 11 are flowcharts showing the operation of the cyclic-transmission control units 130 of the communication masters M10 to M30. Note that it is assumed that period information is stored in the period-information storing units 14 in advance and the communication cycle timers 1300 and the period management timers 1301 have started. In the following explanation, it is assumed that the communication cycle timers 1300 automatically restart after time-up.

As shown in FIG. 9, in the cyclic-transmission control units 130 of the communication masters M10 to M30, the communication cycle timers 1300 count a communication cycle indicated by the information 1401 stored in the network common information 140 (S101). When the communication cycle timers 1300 time up and the communication cycle ends (S101; Y), the communication cycle timers 1300 output the transmission cycle time-up signals 1305 to the period management timers 1301, the transmission control units 1302, and the one or more switch control units 1304 (S102).

When receiving the communication cycle time-up signals 1305, the period management timers 1301 time up and start count of the overall communication period indicated by the information 1403 stored in the network common information 140 (S103). When receiving the communication cycle time-up signals 1305, the one or more switch control units 1304 refer to the switch information 143 and output each of the communication line enable signals 1306A and 1306B in the overall communication period (S104). In the overall communication period, since all the industrial devices 1 are capable of communicating, each of the communication line enable signals 1306A and 1306B output in S104 indicates "ON".

When receiving the communication cycle time-up signal 1305, the transmission control units 1302 determine whether a synchronous communication master station address indicated by the information 1404 stored in the network common information 140 and own station addresses indicated by the information 1421 stored in the station peculiar information 142 coincide (S105). When determined that the synchronous communication master station address and the own station addresses coincide (S105; Y), the transmission control units 1302 store synchronization notifications in the transmission buffers 1311A and 1311B of the transmission/reception control units 131 (S106). Note that it is assumed that the synchronization notifications are generated by the CPUs 10 and stored in the transmission buffers 11. A destination address of the synchronization notifications is a common multicast address indicated by the information 1405 stored in the network common information 140.

The cyclic-transmission control units 130 stay on standby until the period management timers 1301 time up (S107).

When the period management timers 1301 do not time up (S107; N), the cyclic-transmission control units 130 determine whether the reception notification signals 1314A or 1314B from the transmission/reception control units 131 are detected (S108). When inputs are detected (S108; Y), the reception control units 1303 determine on the basis of the input reception notification signals 1314A or 1314B whether the synchronization notifications are received (S109). When it is determined that the synchronization notifications are received (S109; Y), the communication cycle timers 1300 read out reception data from the reception buffers 1310A or 1310B of the transmission/reception control units 131, correct the communication cycle timers 1300 on the basis of the synchronization information stored in the synchronization notifications (S110), and return to S107.

On the other hand, when the period management timers 1301 time up in S107 (S107; Y), the cyclic-transmission control units 130 shift to FIG. 10 and repeat processing explained below by the number of control transmission periods indicated by the information 1402 stored in the period information (S111). First, the period management timers 1301 output the period management time-up signals 1307 to the transmission control units 1302 and the one or more switch control units 1304 (S112).

After outputting the period management time-up signals 1307, the period management timers 1301 read out control transmission period information 141N (N is a natural number and is a number equal to or smaller than the number of control transmission periods) corresponding to the present control transmission period among the control transmission period information 141 (S113) and start count of an output data transmission period indicated by information 141N4 stored in the control transmission period information 141N (S114). Note that an initial value of N is 1. A value of N is stored in the cyclic-transmission control units 130 and added every time the control transmission period ends.

On the other hand, when receiving the period management time-up signals 1307, the one or more switch control units 1304 output each of the communication line enable signals 1306A and 1306B on the basis of ON/OFF of the switches 1312A and 1312B in an output data transmission period indicated by the switch information 143 stored in the period information (S115). In S115, in the case of the communication master M20 shown in FIG. 7, in the output data transmission period 1, the switch control unit 1304 outputs OFF as the communication line enable signal 1306A and outputs ON as the communication line enable signal 1306B. Consequently, in the control transmission period 1, the switch 1312A in the communication master M20 is disconnected, the switch 1312B is connected, and the communication between the communication slave S13 and the communication master M20 is interrupted. In the output data transmission period 2, the switch control unit 1304 outputs ON as the communication line enable signal 1306A and outputs ON as the communication line enable signal 1306B. Consequently, the switch 1312A and the switch 1312B are connected. Consequently, in the control transmission period 2, the switch 1312A in the communication master M20 is connected. Communication between the communication slave S13 and the communication master M20 is enabled.

When receiving the period management time-up signals 1307, the transmission control units 1302 determine whether a communication master station address indicated by information 141N2 stored in the control transmission period information 141N and the own station addresses indicated by the information 1421 coincide (S116). When determined that the communication master station address and the own station addresses coincide (S116; Y), the transmission control units 1302 store, in the transmission buffers 1311A and 1311B of the transmission/reception control units 131, output data stored in the transmission buffers 11 (S117). Note that a destination address of the output data is a communication group multicast address indicated by information 141N1 stored in the control transmission period information 141N. If the communication lines 2 are connected by the processing in S117, the output data is transmitted to the other industrial devices 1. Thereafter, the cyclic-transmission control units 130 stay on standby until the period management timers 1301 time up (S118).

When the period management timers 1301 time up in S118 (S118; Y), the cyclic-transmission control units 130 shift to FIG. 11. The period management timers 1301 output the period management time-up signals 1307 to the transmission control units 1302 and the one or more switch control units 1304 (S119). After the time-up, the period management timers 1301 start count of an input data transmission period indicated by information 141N5 stored in the control transmission period information 141N (S120).

When receiving the period management time-up signals 1307, the one or more switch control units 1304 output each of the communication line enable signals 1306A and 1306B on the basis of ON/OFF of the switches 1312A and 1312B in an input data transmission period indicated by the switch information 143 (S121).

Thereafter, the cyclic-transmission control units 130 stay on standby until the period management timers 1301 time up (S122). When the period management timers 1301 do not time up (S122; N), the cyclic-transmission control units 130 determine whether the reception notification signals 1314A or the reception notification signals 1314B from the transmission/reception control units 131 are detected (S123). When inputs are detected (S123; Y), the reception control units 1303 determine whether a communication master station address indicated by the information 141N1 stored in the control transmission period information 141N and the own station addresses indicated by the information 1421 stored in the station peculiar information 142 coincide (S124). When determining that the communication master station address and the own station addresses coincide (S124; Y), the reception control units 1303 determine whether station addresses stored in reception data and a communication slave station address indicated by the information 141N3 coincide (S125). When determined that the station addresses and the communication slave station address coincide (S125; Y), the reception control units 1303 read out the reception data from the transmission buffers 1310A or 1310B of the transmission/reception control units 131, store the reception data in the reception buffers 12 (S126), and return to S122.

When the period management timers 1301 time up in S122 (S122; Y), the cyclic-transmission control units 130 return to the processing in S111. Processing in the next control transmission period is executed. In this case, the value of N stored in the cyclic-transmission control units 130 is incremented. On the other hand, when determining in S111 that the processing in S112 to S126 is repeated by the number of control transmission periods (S111; N), the cyclic-transmission control units 130 return to the processing in S1 and stay on standby until the end of the communication cycle.

[4-2. Processing Executed in the Communication Slaves]

Figure 12:
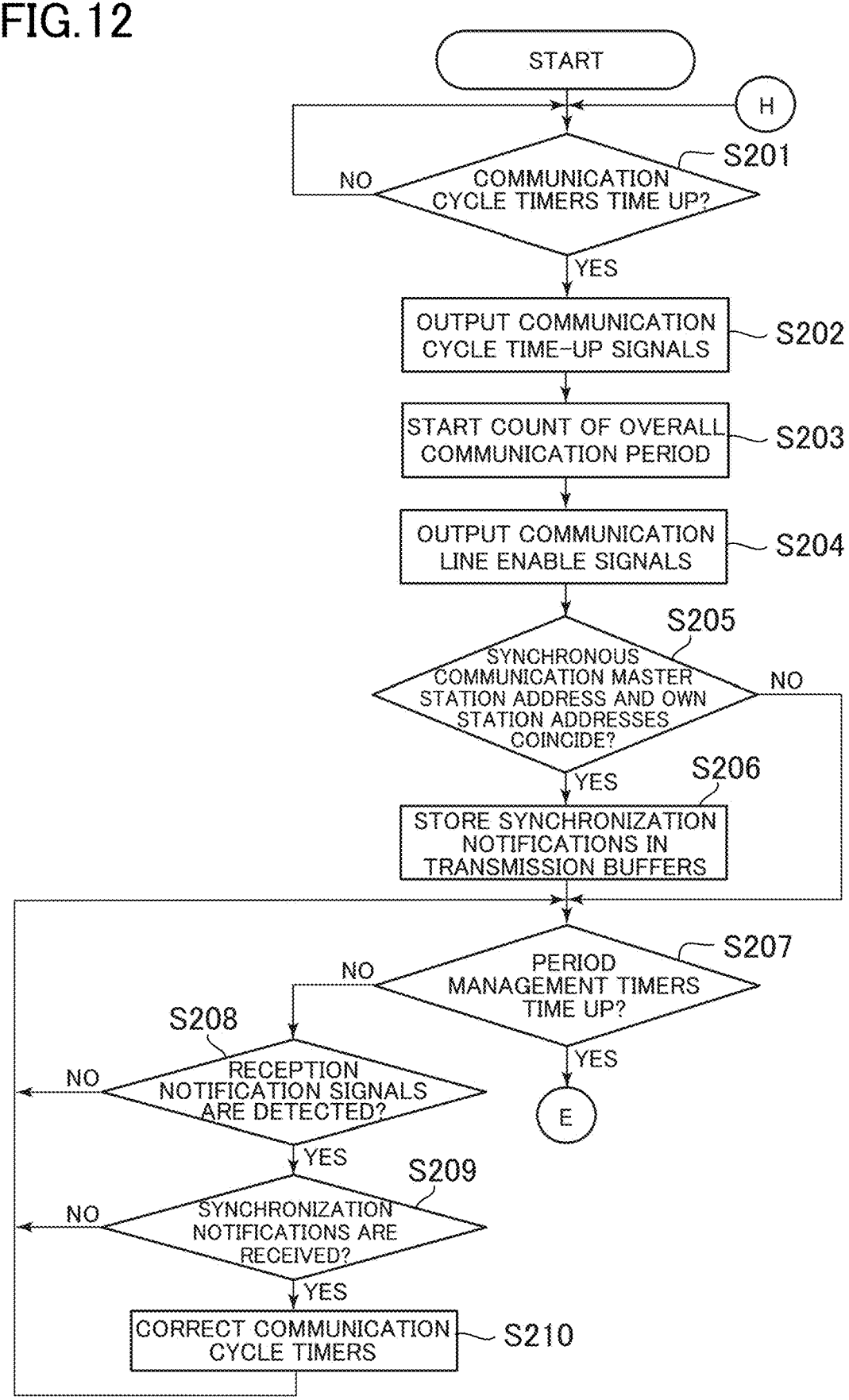
FIG. 12 is a flowchart showing the operation of a cyclic-transmission control unit of a communication slave.
Figure 13:
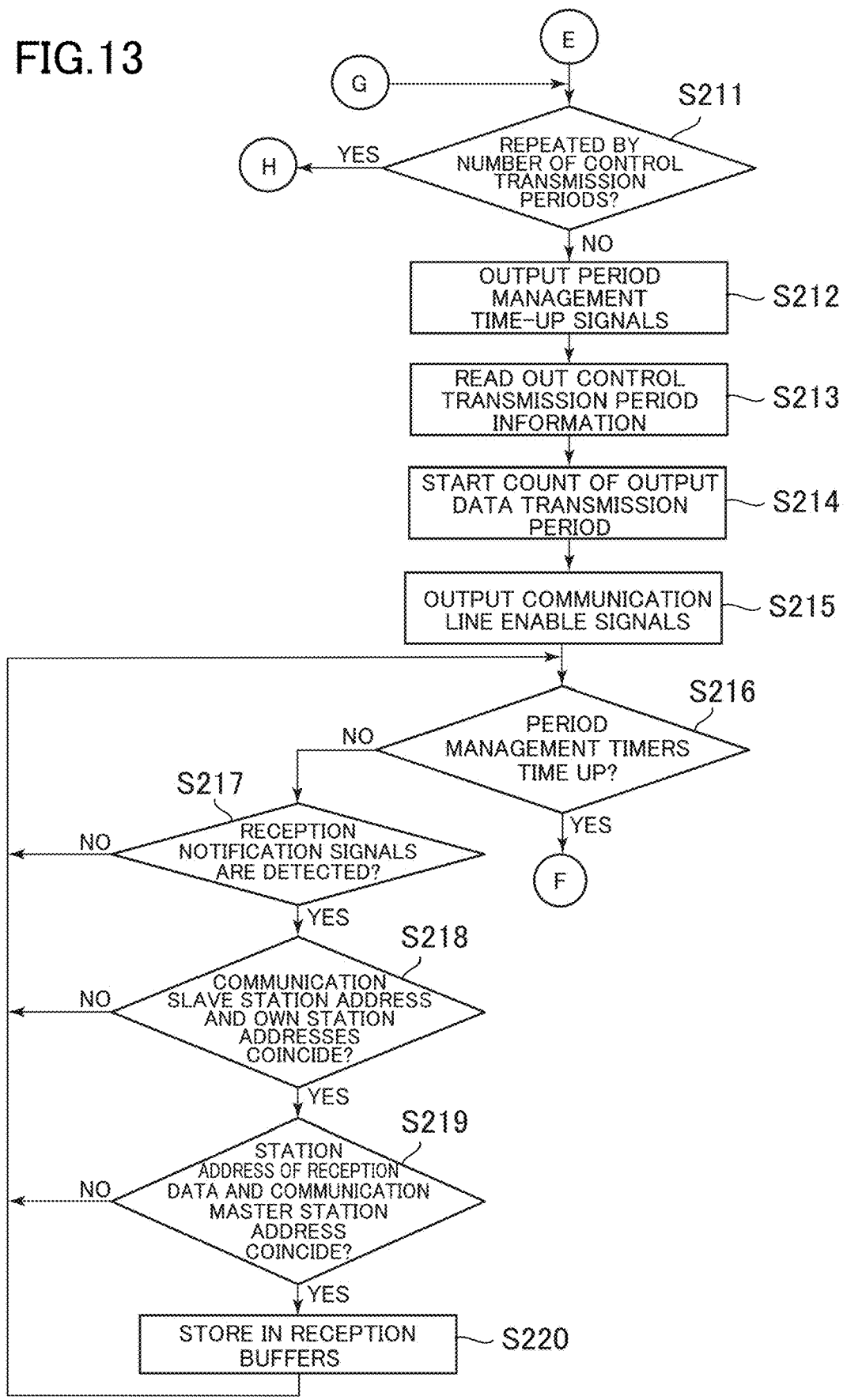
FIG. 13 is a flowchart showing the operation of the cyclic-transmission control unit of the communication slave.
Figure 14:
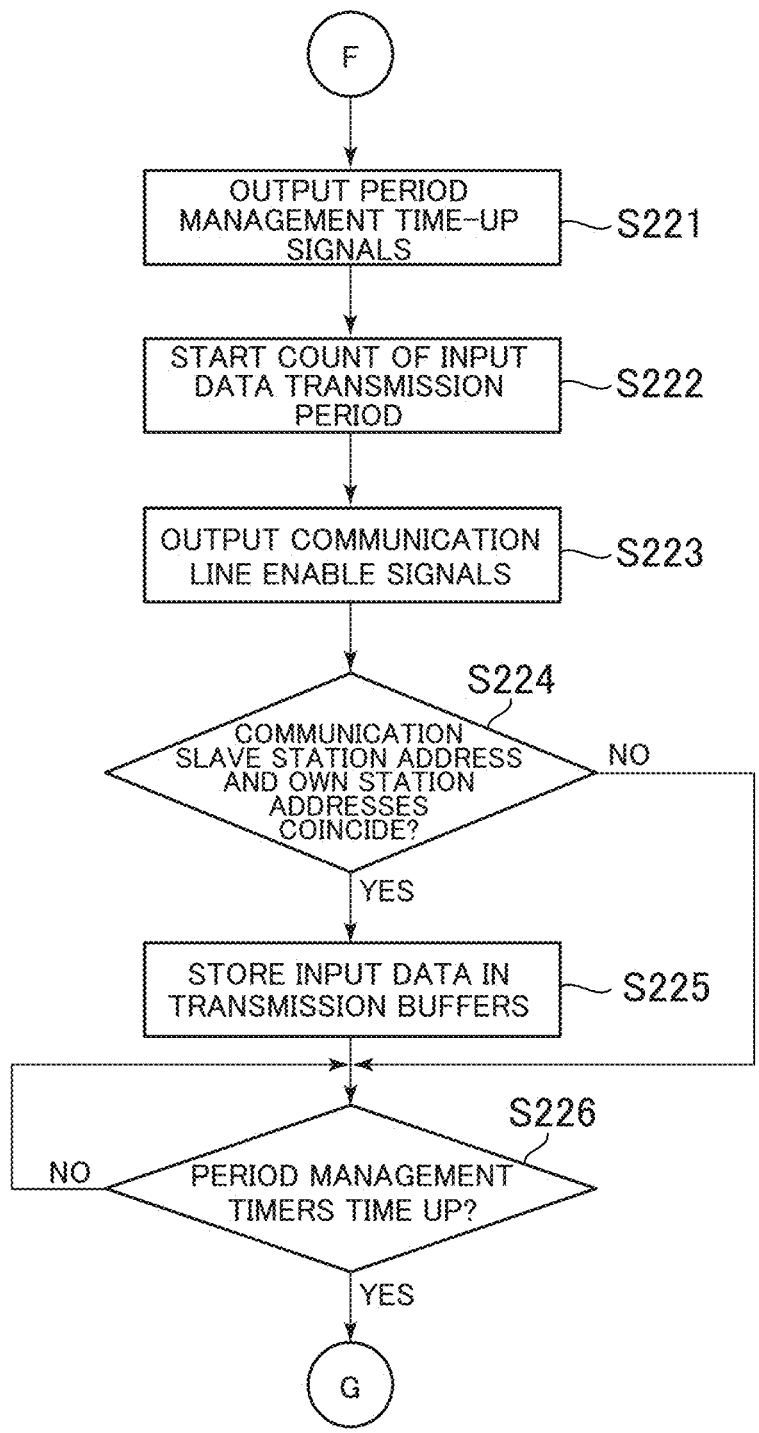
FIG. 14 is a flowchart showing the operation of the cyclic-transmission control unit of the communication slave.

FIG. 12 to FIG. 14 are flowcharts showing the operations of the cyclic-transmission control units 130 of the communication slaves S11 to S22. Note that it is assumed that period information is stored in the period-information storing units 14 in advance and the communication cycle timers 1300 and the period management timers 1301 have started. In the following explanation, it is assumed that the communication cycle timers 1300 automatically restart after time-up. Concerning the same processing as the processing of the cyclic-transmission control units 130 of the communication masters M10 to M30, explanation is omitted. As shown in FIG. 12 and FIG. 13, S201 to S215 are respectively the same as S101 to S115.

When the processing in S215 is executed, the cyclic-transmission control units 130 stay on standby until the period management timers 1301 time up (S216). When the period management timers 1301 do not time up (S216; N), the following S217 is the same as S123. When inputs are detected in S217 (S217; Y), the reception control units 1303 determine whether the communication slave station address indicated by the information 141N3 stored in the control transmission period information 141N and the own station addresses indicated by the information 1421 stored in the station peculiar information 142 coincide (S218). When determining that the communication slave station address and the own station addresses coincide (S218; Y), the reception control units 1303 determine whether station addresses stored in reception data and the communication master station address indicated by the information 141N2 stored in the control transmission period information 141N coincide (S219). When determining that the station addresses and the communication master station address coincide (S219; Y), the reception control units 1303 read out the reception data from the reception buffers 1310A or 1310B of the transmission/reception control units 131, store the reception data in the reception buffers 12 (S220), and return to the processing in S216.

On the other hand, when the period management timers 1301 time up (S216; Y), the cyclic-transmission control units 130 shift to FIG. 14. The following S221 to S223 are respectively the same as S119 to S121. The cyclic-transmission control units 130 determine whether the communication slave station address indicated by the information 141N3 stored in the control transmission period information 141N and the own station addresses indicated by the information 1421 stored in the station peculiar information 142 coincide (S224). When it is determined that the transmission slave station address and the own station addresses coincide (S224), the transmission control units 1302 store, in the transmission buffers 1311A and 1311B of the transmission/reception control units 131, the input data stored in the transmission buffers 11 (S225). Consequently, if the communication lines 2 are connected, the input data is transmitted to the other industrial devices 1. Note that a destination address of the input data is the communication master station address indicated by the information 141N2 stored in the control transmission period information 141N. In order to cause the communication slaves to mutually refer to input data of the other communication slaves, the destination address of the input data may be set to the communication group multicast address indicated by the information 141N1 stored in the control transmission period information 141N. It is assumed that the input data is generated by the CPUs 10 and stored in the transmission buffers 11. The following S226 is the same as S118. When the period management timers 1301 time up (S226; Y), the cyclic-transmission control units 130 returns to the processing in S211. Processing in the next control transmission period is executed. In this case, the value of N stored in the cyclic-transmission control units 130 is incremented. On the other hand, when determining in S211 that the processing in S212 to S226 is repeated by the number of control transmission periods (S211; N), the cyclic-transmission control units 130 return to the processing in S201 and stay on standby until the end of the communication cycle.

5. Summary of the Embodiment

According to the embodiment examined above, the switches 1312A and 1312B are switched such that the communication groups independently communicate. Therefore, it is possible to prevent data of a certain communication group from being transmitted to one or more other communication groups to cause mixture of the data. For example, by preventing mixture of data in the communication groups, it is possible to prevent a communication amount from increasing. For example, it is also possible to prevent the data from conflicting with each other. By turning on/off the switches 1312A and 1312B, the industrial devices 1 that cannot communicate in a certain period can communicate in another period. For example, the industrial devices 1 respectively belonging to different communication groups in a certain period can belong to the same communication group in another period. Since the communication groups can be switched according to the control of the switches 1312A and 1312B, it is unnecessary to prepare a wire for each of the communication groups. It is possible to simplify the communication lines 2 and save wires. For example, when a controller network that connects the communication masters is used, it is necessary to implement, in the communication masters, a relay function for converting communication from the controller network to a field bus. A processing load of the communication masters increases. However, for example, since the relay function can be implemented by only the field bus without using the controller network, it is possible to reduce the processing load of the communication masters.

In a certain control transmission period, a plurality of communication groups can perform parallel operation. As a result, it is possible to further reduce a communication period than when the plurality of communication groups perform operation sequentially so as to start the operation of the next communication group when the operation of a certain communication group ends. As a result, it is possible to improve processing accuracy.

In one communication cycle, the industrial devices 1 respectively belonging to different communication groups can belong to the same communication group. In other words, in one communication cycle, a certain communication slave can be controlled by a plurality of communication masters.

It is possible to switch the communication groups during communication by synchronizing the overall communication system 100.

Since the industrial devices 1 include the switches 1312A and 1312B, the one or more switch control units 1304, and the period-information storing units 14, it is possible to perform control by ON/OFF of the switches 1312A and 1312B in the industrial devices 1. Therefore, it is unnecessary to prepare a repeater or the like separately from the industrial devices 1.

Since the communication master of the initial communication group transmits the period information in the initialization period, it is unnecessary to individually set the period information with respect to the industrial devices 1. As a result, work efficiency is improved and it is possible to prevent human-induced setting mistakes.

By linearly connecting the industrial devices 1 in the upstream side connection ports and the downstream side connection ports, it is possible to simplify the configuration of the communication system 100. It is possible to save wires.

6. Modifications

Note that the present invention is not limited to the embodiment.

For example, a method of setting the communication groups and the control transmission periods is not limited to the method explained in the embodiment. The communication groups only have to be combinations of the communication masters and the communication slaves. The control transmission periods only have to be periods in which data transmission and reception is performed in the communication groups. For example, it is also possible that three control transmission periods are provided, communication groups G1 and G2 are operated in parallel in a control transmission period 1, a communication group G3 is operated in a control transmission period 2, and a communication group G4 including the communication master M10 and the communication slaves S11 to S21 and a communication group G5 including the communication master M30 and the communication slave S22 are operated in parallel in a control transmission period 3. In this case, in the control transmission period 3, the switch 1312B of the communication slave S21 is turned off and the switch 1312A of the communication slave S22 is turned off, whereby the communication line 2 between the communication slave S21 and the communication slave S22 is disconnected.

For example, a connection scheme in the communication system 100 is not limited to the linear connection explained in the embodiment and may be a connection scheme of a star type in which a distributing device such as a hub is used. In this case, for example, the communication master M10 and the communication slaves S11 to S13, the communication master M20 and the communication slaves S21 to S22, and the communication master M30 only have to be connected by the distributing device. Further, in the above explanation, each of the industrial devices 1 includes the two connection ports 132 and 132B. However, the industrial device 1 may include three or more connection ports or may include only one connection port. Each of the industrial devices 1 only has to include the number of communication ports corresponding to a connection form of the communication system 100. Further, the industrial devices 1 in the communication group do not have to be connected by the daisy chain connection.

For example, in the embodiment, the switches 1312A and 1312B and the one or more switch control units 1304 are provided in the industrial devices 1. However, the switches 1312A and 1312B and the one or more switch control units 1304 may be present on the outside of the industrial devices 1. For example, the switches 1312A and 1312B and the one or more switch control units 1304 may be provided in relay devices or distribution devices that connect the industrial devices 1 to one another. In this case, the relay devices or the distribution devices are disposed among the communication groups. The relay devices or the distribution devices execute the same operation as the operation explained in the embodiment to thereby control ON/OFF of the switches 1312A and 1312B.

For example, in the embodiment, the period information is stored in the industrial devices 1. The switch control unit 1304 turns on and off the switches 1312A and 1312B on the basis of the period information. However, the switch control unit 1304 may control ON/OFF of the switches 1312A and 1312B on the basis of information other than the period information or signals. For example, communication masters of communication groups may transmit signals indicating ON/OFF of the switches 1312A and 1312B to communication slaves at the ends of the communication groups (i.e., communication slaves connected to one or more other communication groups by the communication lines 2). The communication slaves at the ends may control ON/OFF of the switches 1312A and 1312B on the basis of the signals. Besides, for example, a host device that controls the communication system 100 may be connected. The industrial devices 1 may receive the similar signals from the host device.

For example, in the embodiment, the output data transmission bands and the input data transmission bands are separated in the control transmission periods. However, the output data transmission bands and the input data transmission bands do not have to be separated. For example, a combination of data transmission and reception in which a communication master transmits output data to a communication slave and the communication slave receiving the output data transmits input data may be sequentially executed on all communication slaves. For example, separately from the output data transmission bands or the input data transmission bands, a message transmission period in which asynchronous communication is performed for the purposes of parameter setting, parameter reference, and the like of the communication slaves may be present. Message data transmitted and received in the message transmission period is data having variable length (any size) transmitted for the purposes of maintenance and engineering of the industrial devices 1. The message data is transmitted at any timing (irregularly).

Note that the industrial devices 1 only have to include communication means for communicably connecting the industrial devices 1 to one another and are not limited to the communication means by wire explained in the embodiment. The industrial devices 1 may include wireless communication interfaces such that exchange of control data is performed by wireless communication. In this case, the communication means is realized by the wireless communication interfaces. The wireless communication may be infrared communication or the like.

When a communication group is caused to communicate independently from one or more other communication groups, the industrial devices 1 only has to include preventing means for preventing data of one or more other communication groups from being mixed in a communication group that independently communicate in each of a plurality of control transmission periods. For example, mixture of data may be prevented by an address filter other than the switch 1312A and the switch 1312B. In this case, the preventing means of the industrial device 1 present at the end of the communication group only has to hinder, with an address filter, data to addresses other than station addresses of the industrial devices 1 of the communication group from passing to thereby prevent the data of the one or more other communication groups from being mixed.

For example, in the embodiment, the fixed cycle communication is explained as the example. However, in the communication system 100, acyclic communication may be performed. In the case of the acyclic communication, the industrial devices 1 only have to disconnect the communication lines 2 according to a communication group at that time to enable independent communication in the communication group. For example, a data storage example of the period information is not limited to the example explained in the embodiment. In the period information, a relation between control transmission periods and communication groups only has to be defined. In other words, it should be understood by those skilled in the art that various modifications, combinations, sub-combinations and alterations may occur depending on design requirements and other factors insofar as they are within the scope of the appended claims or equivalents thereof.

The invention claimed is:

1. An industrial device communication system comprising:
   a first communication master, a second communication master, a first communication slave and a second communication slave that are all connected in series;
   one or more switches for causing a first communication group including the first communication master and the first communication slave to communicate independently from a second communication group including the second communication master and the second communication slave; and
   one or more switch controllers that cause the one or more switches to disconnect an inter-group communication line present between the first communication group and the second communication group if it is a period when the first communication master controls the first communication slave and the second communication master controls the second communication slave and cause the one or more switches to connect the inter-group communication line if it is not the period.

2. The industrial device communication system according to claim 1, wherein each of the first communication group and the second communication group independently communicates in at least one of plurality of periods.

3. The industrial device communication system according to claim 2, wherein fixed cycle communication is performed in the industrial device communication system, the period is included in one communication cycle.

4. The industrial device communication system according to claim 2, wherein each of the first communication master, the second communication master, the first communication slave and the second communication slave comprises:
   the one or more switches;
   the one or more switch controllers; and
   a period-information storage that store period information concerning the period, and
   wherein the one or more switch controllers control the one or more switches on the basis of the period information.

5. The industrial device communication system according to claim 2, wherein each of the first communication master, the second communication master, the first communication slave and the second communication slave comprises at least an upstream side connection port and a downstream side connection port for communicably connecting to the other industrial devices, and
   wherein the first communication master, the second communication master, the first communication slave and the second communication slave are linearly connected by connecting the upstream side port and the downstream side port of the industrial devices.

6. The industrial device communication system according to claim 1, wherein fixed cycle communication is performed in the industrial device communication system, and the period is included in one communication cycle.

7. The industrial device communication system according to claim 6, wherein, in an overall communication period in which an overall communication group including all industrial devices included in the industrial device communication system is caused to communicate, one of the industrial devices functioning as a communication master of the overall communication group transmits a synchronization notification.

8. The industrial device communication system according to claim 7, wherein each of the first communication master, the second communication master, the first communication slave and the second communication slave comprises:
   the one or more switches;
   the one or more switch controllers; and
   a period-information storage that store period information concerning the period, and
   wherein the one or more switch controllers control the one or more switches on the basis of the period information.

9. The industrial device communication system according to claim 7, wherein each of the first communication master, the second communication master, the first communication slave and the second communication slave comprises at least an upstream side connection port and a downstream side connection port for communicably connecting to the other industrial devices, and
   wherein the first communication master, the second communication master, the first communication slave and the second communication slave are linearly connected by connecting the upstream side port and the downstream side port of the industrial devices.

10. The industrial device communication system according to claim 6, wherein each of the first communication master, the second communication master, the first communication slave and the second communication slave comprises:
    the one or more switches;
    the one or more switch controllers; and
    a period-information storage that store period information concerning the period, and
    wherein the one or more switch controllers control the one or more switches on the basis of the period information.

11. The industrial device communication system according to claim 6, wherein
    each of the first communication master, the second communication master, the first communication slave and the second communication slave comprises at least an upstream side connection port and a downstream side connection port for communicably connecting to the other industrial devices, and
    wherein the first communication master, the second communication master, the first communication slave and the second communication slave are linearly connected by connecting the upstream side port and the downstream side port of the industrial devices.

12. The industrial device communication system according to claim 1, wherein each of the first communication master, the second communication master, the first communication slave and the second communication slave comprises:
    the one or more switches;
    the one or more switch controllers; and
    a period-information storage that store period information concerning the period, and
    wherein the one or more switch controllers control the one or more switches on the basis of the period information.

13. The industrial device communication system according to claim 12, wherein in an initialization period of the industrial device communication system, communication is performed in an initial communication group including all of industrial devices included in the industrial device communication system, and one of the industrial devices functioning as a communication master of the initial communication group transmits the period information to the other industrial devices in the initialization period.

14. The industrial device communication system according to claim 13, wherein each of the first communication master, the second communication master, the first communication slave and the second communication slave comprises at least an upstream side connection port and a downstream side connection port for communicably connecting to the other industrial devices, and wherein the first communication master, the second communication master, the first communication slave and the second communication slave are linearly connected by connecting the upstream side port and the downstream side port of the industrial devices.

15. The industrial device communication system according to claim 12, wherein each of the first communication master, the second communication master, the first communication slave and the second communication slave comprises at least an upstream side connection port and a downstream side connection port for communicably connecting to the other industrial devices, and wherein the first communication master, the second communication master, the first communication slave and the second communication slave are linearly connected by connecting the upstream side port and the downstream side port of the industrial devices.

16. The industrial device communication system according to claim 1, wherein each of the first communication master, the second communication master, the first communication slave and the second communication slave comprises at least an upstream side connection port and a downstream side connection port for communicably connecting to the other industrial devices, and wherein the first communication master, the second communication master, the first communication slave and the second communication slave are linearly connected by connecting the upstream side port and the downstream side port of the industrial devices.

17. The communication method according to claim 1, further comprising one or more communication master and one or more communication slave.

18. A communication method in an industrial device communication system including a first communication master, a second communication master, a first communication slave and a second communication slave that are all connected in series, and one or more switches for causing a first communication group including the first communication master and the first communication slave to communicate independently from a second communication group including the second communication master and the second communication slave, the communication method comprising: causing the one or more switches to disconnect an inter-group communication line present between the first communication group and the second communication group if it is a period when the first communication master controls the first communication slave and the second communication master controls the second communication slave, and causing the one or more switches to connect the inter-group communication line if it is not the period.

19. An industrial device functioning as any one of a first communication master, a second communication master, a first communication slave and a second communication slave that are all connected in series;

the industrial device comprising:

one or more switches for causing a first communication group including the first communication master and the first communication slave to communicate independently from a second communication group including the second communication master and the second communication slave; and one or more switch controllers that cause the one or more switches to disconnect an inter-group communication line present between the first communication group and the second communication group if it is a period when the first communication master controls the first communication slave and the second communication master controls the second communication slave and cause the one or more switches to connect the inter-group communication line if it is not the period.

20. An industrial device communication system comprising:

a first communication master, a second communication master, a first communication slave and a second communication slave that are all connected in series; and preventing means for preventing data of the first communication groups from being mixed in the second communication group if it is a period when the first communication master controls the first communication slave and the second communication master controls the second communication slave, and permitting the data to be mixed in the second communication group.

* * * * *